United States Patent
Tsuda et al.

[19]

[11] Patent Number: 6,138,524
[45] Date of Patent: Oct. 31, 2000

[54] MOUNTING ARRANGEMENT FOR A DEVICE FOR DETECTING THE FUEL LEVEL IN A FUEL TANK

[75] Inventors: Shinji Tsuda, Okazaki; Kingo Okada, Toyohashi; Keiichi Yamashita, Kariya; Yoshifumi Terada, Toyota, all of Japan

[73] Assignee: Denso Corporation, Kariya, Japan

[21] Appl. No.: 08/852,735

[22] Filed: May 7, 1997

[30] Foreign Application Priority Data

| May 8, 1996 | [JP] | Japan | 8-113966 |
| Sep. 26, 1996 | [JP] | Japan | 8-254939 |

[51] Int. Cl.$^7$ .............. G01F 23/30; F04B 35/04
[52] U.S. Cl. .............. 73/866.5; 73/313; 73/306; 123/509
[58] Field of Search .............. 73/313, 322.5, 73/306, 866.5, 290 R; 123/509; 417/17, 40, 182.5

[56] References Cited

U.S. PATENT DOCUMENTS

| 4,651,701 | 3/1987 | Weaver | 123/509 |
| 5,211,547 | 5/1993 | Gaston et al. | 417/360 |
| 5,775,877 | 7/1998 | Genz | 417/41 |

FOREIGN PATENT DOCUMENTS

| 60-145326 | 9/1985 | Japan . |
| 2-71231 | 5/1990 | Japan . |

*Primary Examiner*—Hezron Williams
*Assistant Examiner*—Michael Cygan
*Attorney, Agent, or Firm*—Pillsbury Madison & Sutro LLP

[57] ABSTRACT

A fuel level detecting device has a first locking mechanism including a locking member, clamping portions for clamping a mounting surface, and pawl arms which are on a body of the device. A slit and engagement portions are provided on the mounting face of the mounting member, which acts as a second locking mechanism. The thickness of the locking member is equal to or slightly larger than the width of the slit, and the gap between a clamping portion and a contact face is equal to or slightly smaller than the thickness of the mounting face. The body is mounted to the mounting member when the locking member is inserted into the slit. This ensures the fuel detecting device to be mounted without play and disconnection thereof even when vibration occurs.

16 Claims, 22 Drawing Sheets

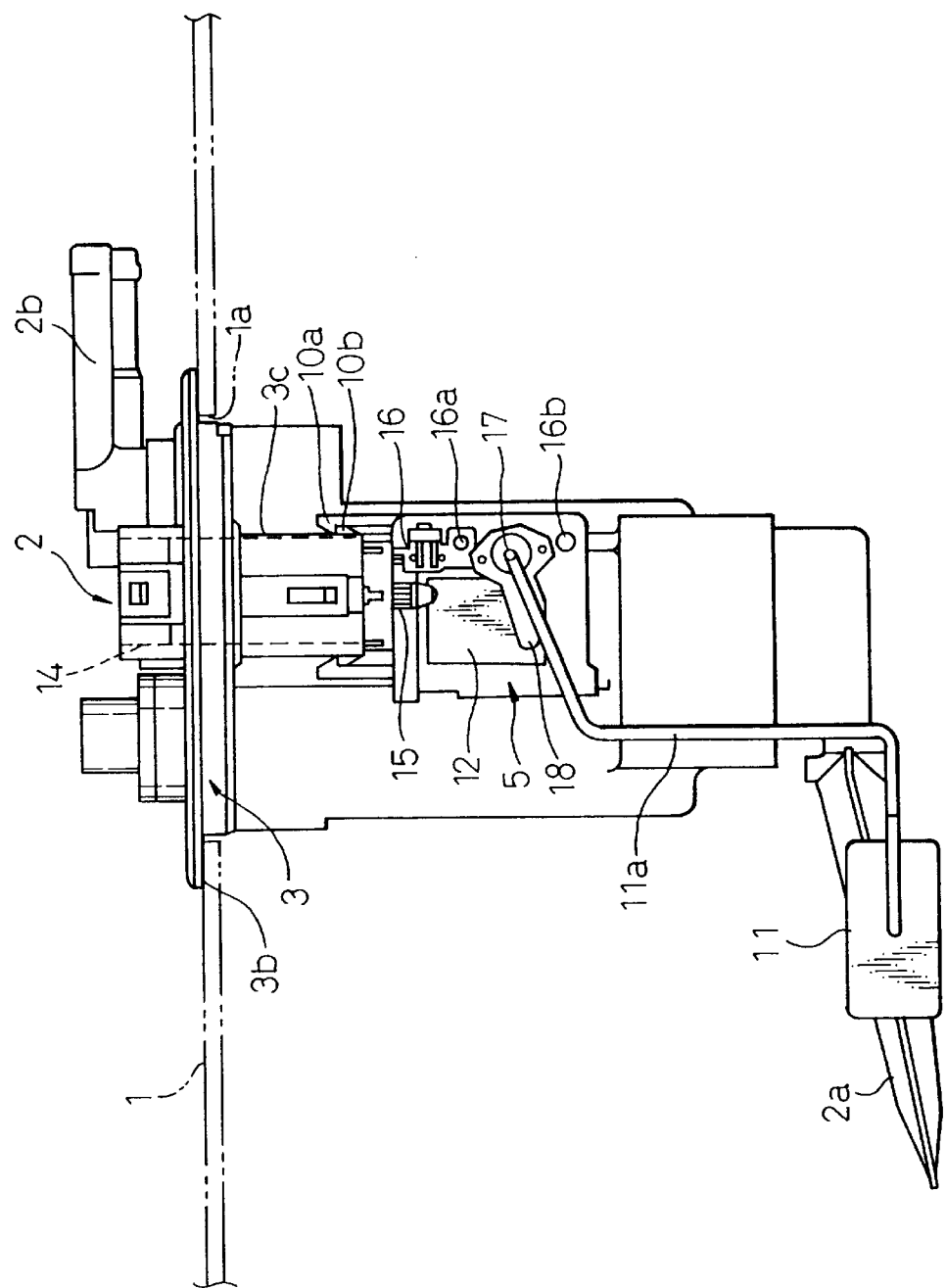

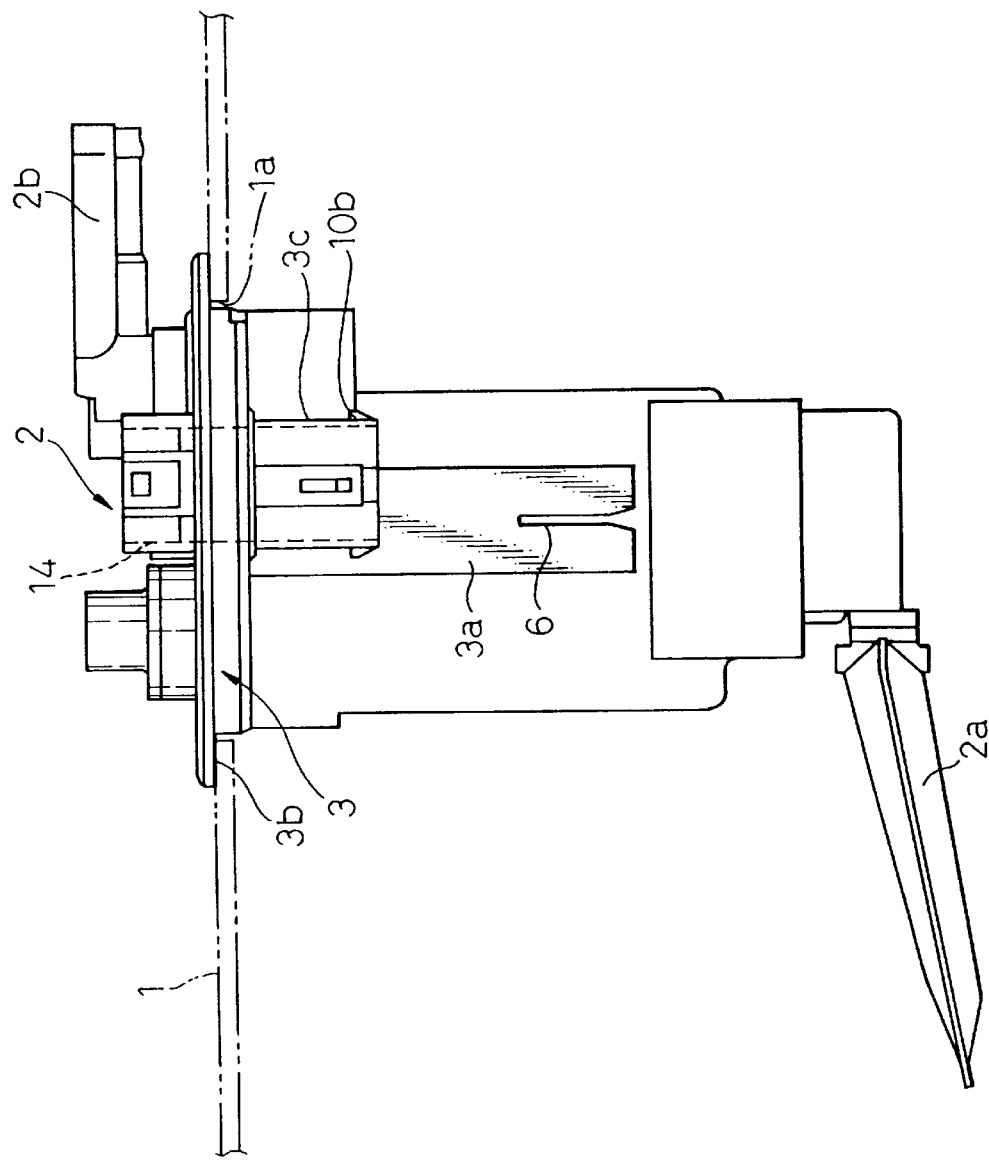

MOUNTING ARRANGEMENT FOR A DEVICE FOR DETECTING THE FUEL LEVEL IN A FUEL TANK

BACKGROUND OF THE INVENTION

1. Field of the Invention

The invention relates to a mounting arrangement for a fuel level detecting device in an automobile fuel tank. The fuel level detecting device is provided with an electric output unit which generates output signal in proportion to the fuel level in the fuel tank.

2. Description of the Related Art

In the prior art, a fuel level detecting device and a fuel supply pump are mounted to a fuel tank as one piece, which makes the mounting work simple compared with that in the case where they are mounted separately.

In this case, the fuel level detecting device is mounted to a fuel tank by securing it to a member for mounting a fuel supply pump to a fuel tank with a holder therebetween. However, the mounting work is troublesome as it is necessary to use screws to mount the device.

The invention is directed to solve the above-mentioned problem, and the objective of the invention is to improve a mounting arrangement for a fuel detecting device by reducing the work, such as a screwing operation, for mounting a fuel level detecting device.

SUMMARY OF THE INVENTION

According to a feature of the invention, a mounting arrangement for a device for detecting the fuel level in the fuel tank is provided. The fuel level detecting device is adapted to a fuel tank that has a built-in fuel supply pump mounted to the fuel tank by means of a mounting member. The mounting arrangement comprises a body (5) of the fuel level detecting device which includes a first locking structure, also referred to as a first locking means (4, 10a, 5e, 5f, 5g), and an electric output unit (12) which generates an electric output in accordance with the fuel level in the fuel tank (1). The mounting member (3) has a mounting face (3a) which includes a second locking structure, also referred to as a second locking means (6, 10b, 21, 22). The body (5) is mounted to the mounting member (3) by the resilient engagement between the first locking means (4, 10a, 5e, 5f, 5g) and the second locking means (6, 10b, 21, 22).

According to another feature of the invention, a mounting arrangement for a device for detecting the fuel level in the fuel tank is provided. The fuel level detecting device is adapted to a fuel tank that has a built-in fuel supply pump mounted to the fuel tank by means of a mounting member. The mounting arrangement comprises a body (5) of the fuel level detecting device which includes a first locking means (4, 10a, 5e, 5f, 5g), and an electric output unit (12) which generates electric output in accordance with the fuel level in the fuel tank (1). The fuel supply pump (2) has a mounting face (2a) which includes a second locking means (6, 10b, 21, 22). The body (5) is mounted to the fuel supply pump (2) by the resilient engagement between the first locking means (4, 10a, 5e, 5f, 5g) and the second locking means (6, 10b, 21, 22).

The first locking means and the second locking means resiliently engage with each other to mount the fuel level detecting device to either the mounting member (3) or the fuel tank (2), which reduces and simplifies the mounting work, such as a screwing operation, and eliminates the use of a holder which is required in the prior art, whereby the production cost can be significantly reduced.

The first locking means (4, 10a, 5e, 5f, 5g) can be disposed at different height in a vertical direction, and the second locking means (6, 10b, 21, 22) engages one of the first locking means (4, 10a, 5e, 5f, 5g) optionally selected. To the contrary, the second locking means (6, 10b, 21, 22) may be disposed at different height in a vertical direction, and the first locking means (4, 10a, 5e, 5f, 5g) engages one of the second locking means (6, 10b, 21, 22) selected. Thus, the height of the position to which the fuel level detecting device is mounted can be changed corresponding to the configuration the fuel tank.

The first locking means (4, 10a, 5e, 5f, 5g) may comprise a locking member (4) extending from a contact face (5a) of the body (5), clamping portions (8) provided on the locking member (4), perpendicular to the direction of the thickness (9) of the mounting face (3a, 2c), for clamping the mounting face (3a, 2c), and a plurality of pawl arms (10a) extending from either ends of the top face of the body (5) toward the mounting member (3). The second locking means (6, 10b, 21, 22) may include a slit (6) for receiving the locking member (4), and engagement portions (10b) to which the pawls (10a) resiliently engage. The thickness (4a) of the locking member (4) in the direction of the slit (6) is equal to or slightly larger than the width (6a) of the slit (6), and the gap (4b) between the clamping portions (8) and the contact face (5a) of the body (5) which contacts the mounting face (3a, 2c) is equal to or slightly smaller than the thickness (9).

Once the locking member (4) is inserted into the slit (6) to its bottom end, the mounting arrangement can eliminate the play of the fuel level detecting device in the direction of the width of the slit (6) as well as play in the direction of the thickness (9) of the mounting face since the thickness (4a) of the locking member (4) is equal to or slightly larger than the width (6a), and the gap (4b) is equal to or slightly smaller than the thickness (9). Further, the engagement between the pawl arms (10a) and engagement portions (10b) prevent the locking member (4) from disconnecting from the slit. Thus, the fuel level detecting device can be mounted stably even when vibration occurs. The mounting arrangement may include an opening (5e, 5f, 5g) in the contact face (5a) as the first locking means in addition to the pawl arms (10a), and pawls (21, 22) which resiliently engage the openings (5e, 5f, 5g) as the second locking means in addition to the engagement portions (10b). The engagement between the openings and the pawls ensures that the fuel level detecting device is mounted correctly.

According to another feature of the invention, an opening (5e) in the contact face (5a) can substitute for the pawl arms (10a) as the first locking means, and pawls (21) can substitute for the engagement portion (10b) as the second locking means to prevent the locking member (4) from disconnected from the slit (6).

According to another feature of the invention, locking member (4) comprises a plurality of lugs (7) having the thickness (4a). In this mounting arrangement, the locking member (4) contacts the slit (6) only at the lugs (7), which reduces the friction between the locking member and the slit during the insertion of the locking member (4) into the slit (6). Thus, the insertion of the locking member (4) into the slit (6) becomes easy.

Another feature of the invention comprises; an electric terminal (13) provided on the body (5), the electric terminal being adapted to be connected to the electric output unit (12); a holding frame (3c) provided on the contact face (3b) of the mounting member (3) which face contacts the fuel tank (1); and connectors (14) secured to the holding frame (3c) for electrically connecting between the inside and outside of the fuel tank (1). The electric terminal (13) is inserted and electrically connected to an electric contact of one of the connectors (14) located within the fuel tank once the body (5) is mounted to the mounting face (3a, 2c) through the first locking means (4, 10a, 5e, 5f, 5g) and the second locking means (6, 10b, 21, 22).

Thus, when the fuel level detecting device is mounted to the mounting member (3), electric conduction between inside and outside of the fuel tank (1) is obtained at the same time, which eliminates troublesome work, for example, wiring work, for obtaining electric conduction between inside and outside of a fuel tank (1).

DESCRIPTION OF THE DRAWINGS

These and other objects and advantages and further description will now be discussed in connection with the drawings in which:

FIG. 4 is a general view of a fuel supply pump in which the fuel level detecting device has been mounted to the fuel supply pump;

FIG. 5 is a general view of the fuel supply pump 2 in which the fuel level detecting device is not mounted on the mounting face 3a shown in FIGS. 1 to 3;

DESCRIPTION OF THE PREFERRED EMBODIMENTS

The First Embodiment

With reference to FIGS. 1 to 8, a mounting arrangement for a device for detecting the fuel level in a fuel tank according to the first embodiment of the invention will be described, in which the invention is applied to a mounting member 3 of a fuel supply pump 2 provided in a fuel tank 1 of an automobile.

Figure 1:
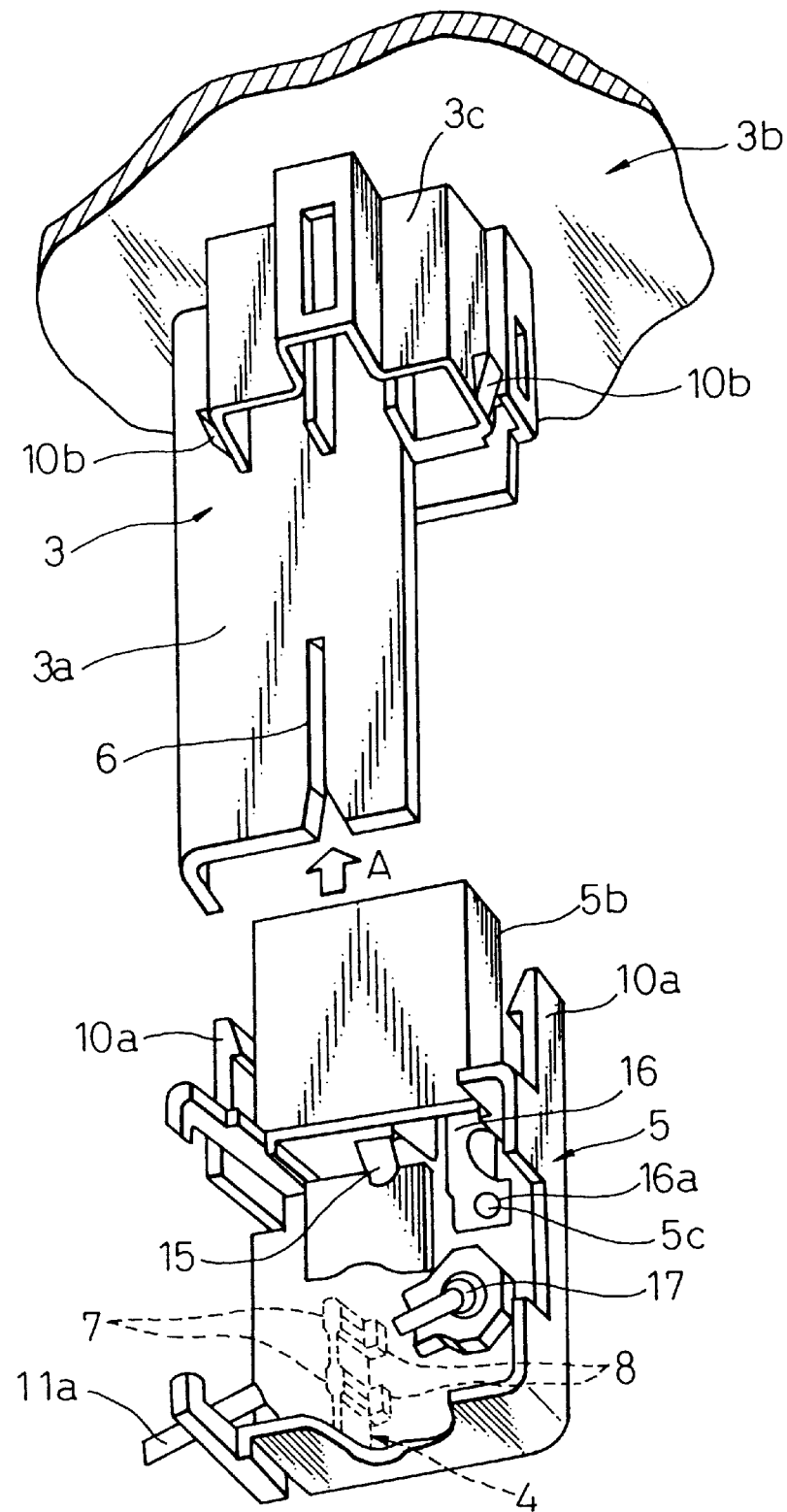
FIG. 1 is a partial schematic perspective view of a mounting member and a body according to the first embodiment of the invention, in which the body is shown before being mounted to the mounting member.

FIG. 1 is a partial schematic representation of a body 5 of the mounting arrangement which is shown before mounted to a mounting face 3a. The body 5 is adapted to be mounted to a mounting surface 3a in the direction indicated by an arrow A.

The fuel supply pump 2 draws the fuel in the fuel tank 1 through a filter 2a and supplies it to an automobile engine (not indicated) through a pipe 2b. The fuel supply pump 2 has a generally cylindrical shape in the embodiment. The fuel supply pump 2 is mounted to the fuel tank 1 through the mounting member 3.

The mounting member 3 is attached to the fuel supply pump 2 in advance, and is thereafter mounted to the fuel tank 1. In the upper face of the fuel tank 1, a circular opening is provided for insertion of the supply pump 2. The mounting member 3 is formed into a disk shape to be adapted to the opening 1a. Then, the fuel tank and the mounting member 3 are secured, for example, by screws.

Meanwhile, a resin or metal material is used as a material of the mounting member 3, and in the embodiment, polyacetal is advantageously used.

The mounting member 3 includes the mounting face 3a to which the body 5 is mounted. The mounting face 3a is, as shown in FIGS. 1 and 5, formed perpendicular to a contact face 3b of the mounting member 3 which contacts the fuel tank 1 when the mounting member 3 is mounted to the fuel tank 1. The body 5 is formed of, for example a resin material and, in particular, polyacetal is advantageously employed in this embodiment.

A first locking structure, also referred to as a first locking means, is provided on the body 5, and a second locking structure, also referred to as a second locking means, is provided in the mounting face 3a so that the body 5 is mounted to the mounting face 3a. In the embodiment, as the first locking means, a locking member 4 is formed perpendicular to a contact face 5a, as shown in FIGS. 2A and 2B, which contacts the mounting face 3a, and as the second locking means, a slit 6 for holding the locking member 4 is formed as shown in FIGS. 3A and 3B.

Figure 2A:
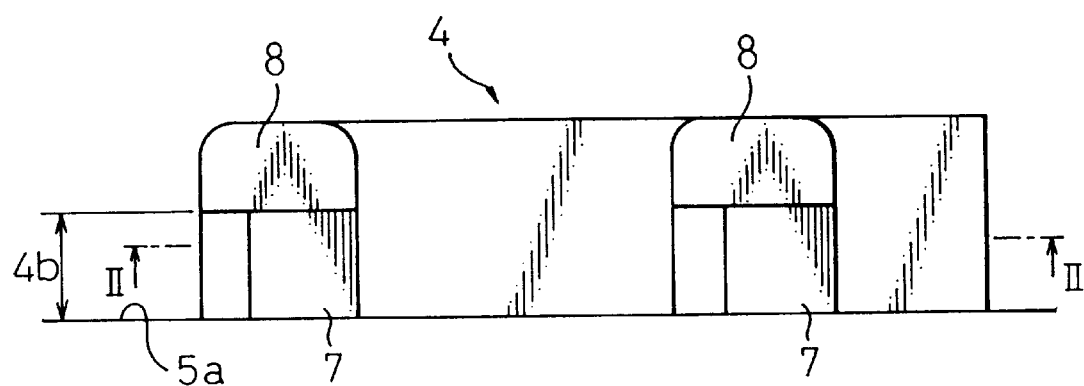
FIG. 2A is an enlarged detail of a locking member shown in FIG. 1.
Figure 2B:
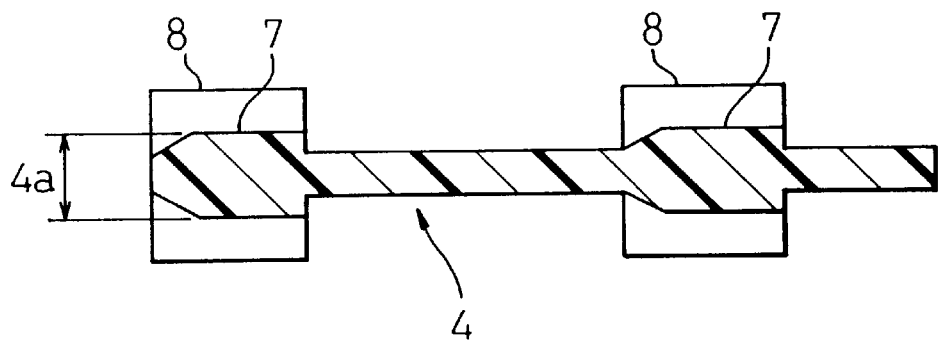
FIG. 2B is a sectional view along line II—II in FIG. 2A.
Figure 3A:
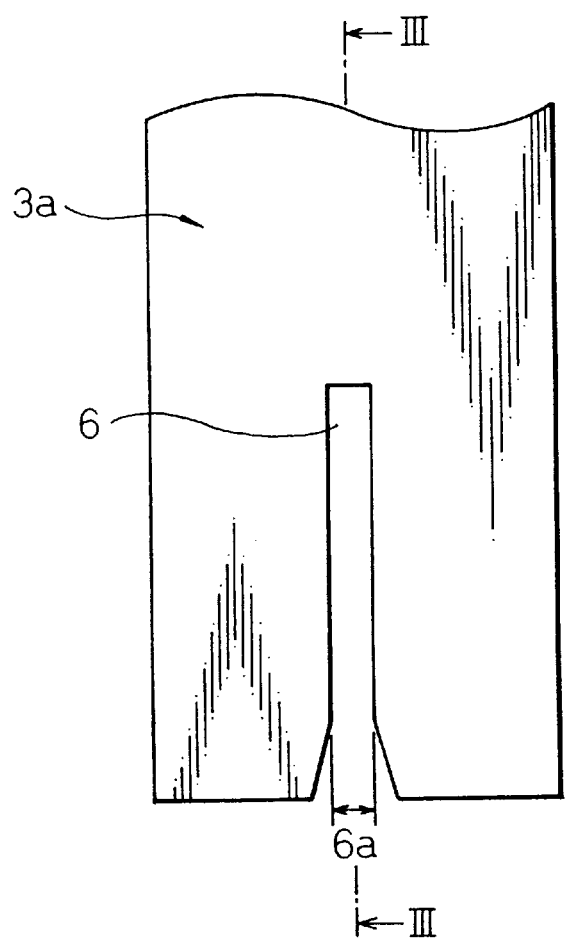
FIG. 3A is an enlarged detail of a mounting face.
Figure 3B:
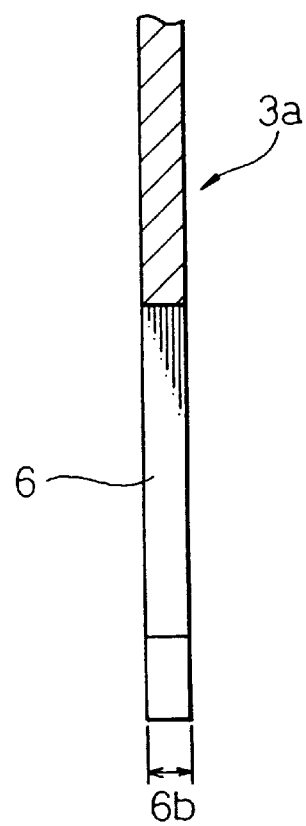
FIG. 3B is a sectional view along line III—III in FIG. 3A.

FIG. 2A is an enlarged side view of the locking member 4 and FIG. 2B is a section of the locking member 4 along line II—II in FIG. 2A. With reference to FIGS. 2A and 2B, the thickness 4a of the locking member 4 in the direction of the width 6a of the slit 6 is equal to or slightly larger than the width 6a of the slit 6 so that the locking member 4 is inserted into the slit 6 without play in the direction of the width 6a. The locking member 4 may have only a uniform thickness 4a, in the embodiment, however, lugs 7 which laterally protrude in the width direction of the slit 6 are advantageously provided on the locking member 4. The thickness of the lugs 7 is set at the thickness 4a. Thus, at the insertion of the locking member 4 into the slit 6, frictional resistance is reduced compared with the uniform thickness because only the lugs 7 contact and receive resistance.

Further, the locking member 4 includes clamping portions 8 which laterally extend from the top of the locking member 4 to clamp the mounting face 3a between the clamping portions 8 and the contact face 5a of the body 5 which contacts the mounting face 3a. The gap 4b between the contact face 5a and the clamping portions 8 equal to or slightly smaller than the thickness of the mounting face 3a. Thus, the mounting face 3a is clamped between the clamping portions 8 and the contact face 5a to prevent play in the direction of the thickness of the mounting face 3a.

Figure 6:
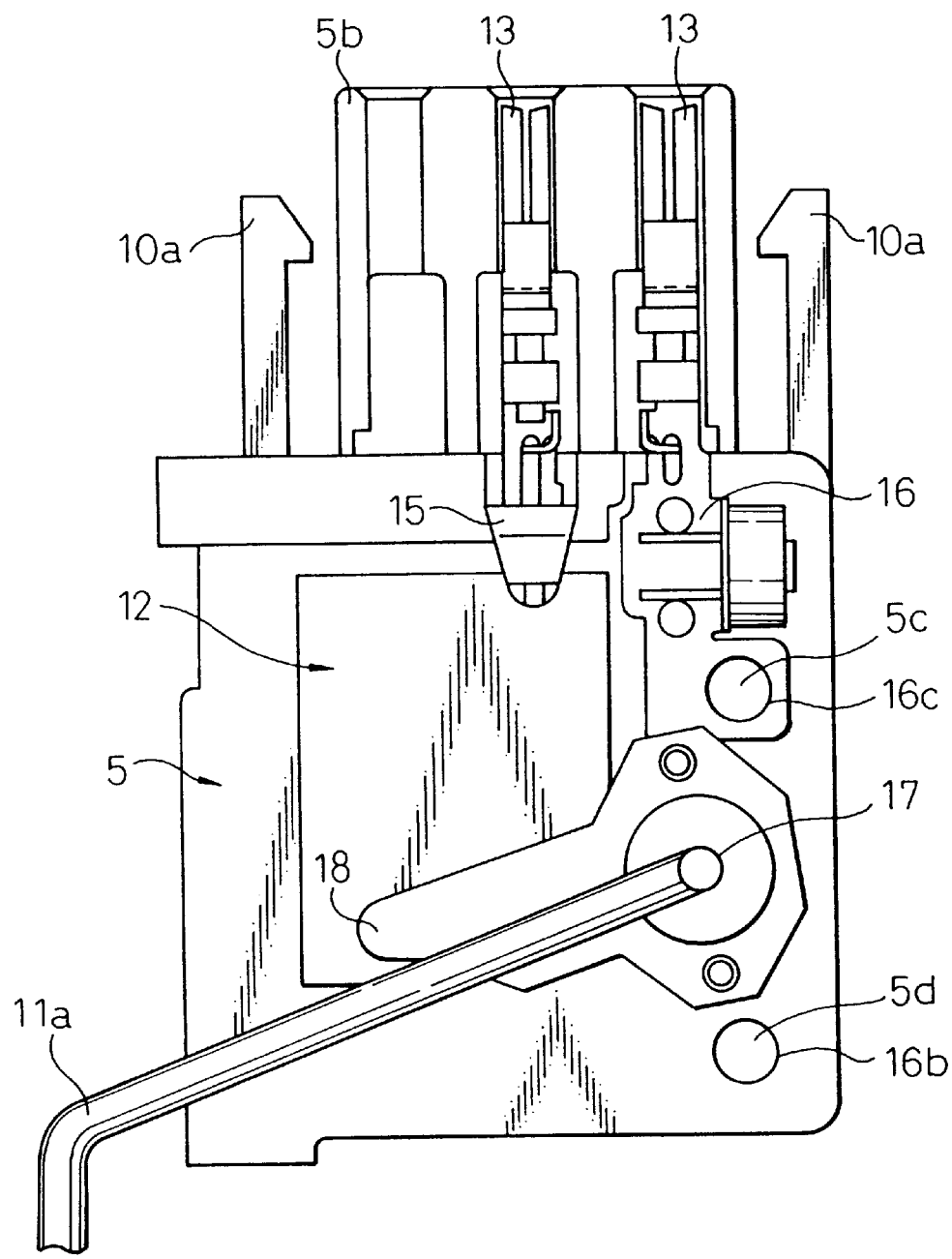
FIG. 6 is a front elevation of the fuel level detecting device in which the device is not mounted on the mounting member 3 shown in FIG. 1.
Figure 7:
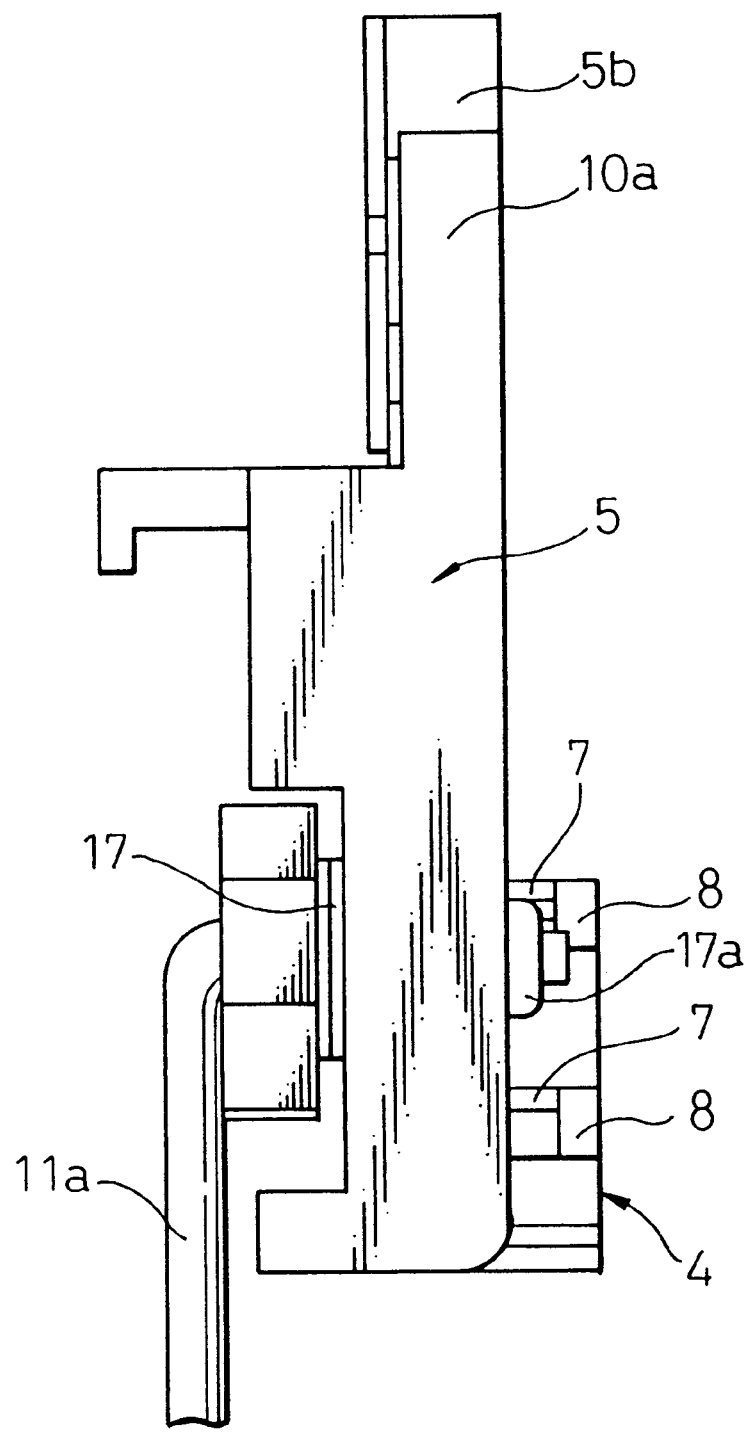
FIG. 7 is a side view of the fuel level detecting device shown in FIG. 6.
Figure 8:
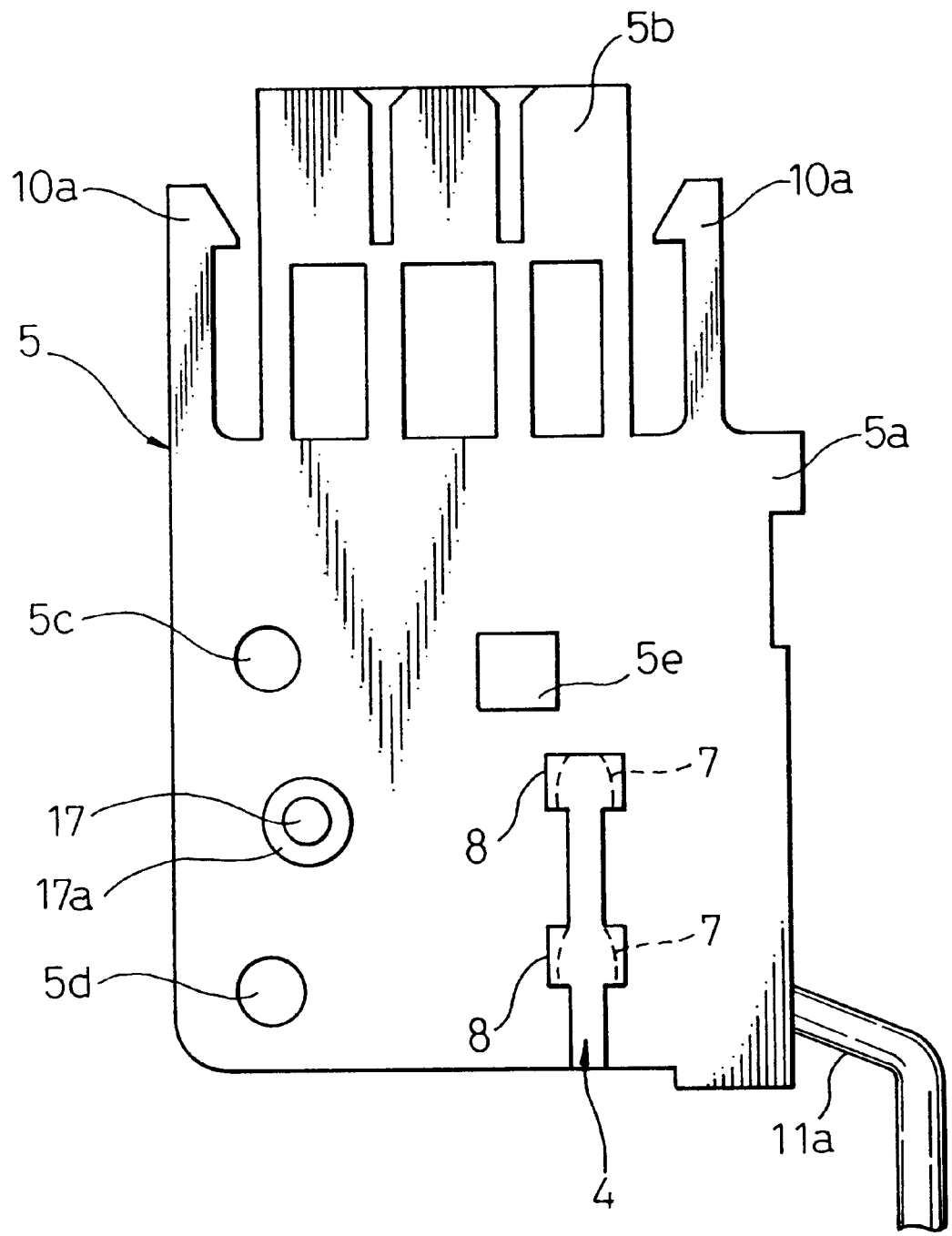
FIG. 8 is a rear elevation of the fuel level detecting device shown in FIGS. 6 and 7.
Figure 9:
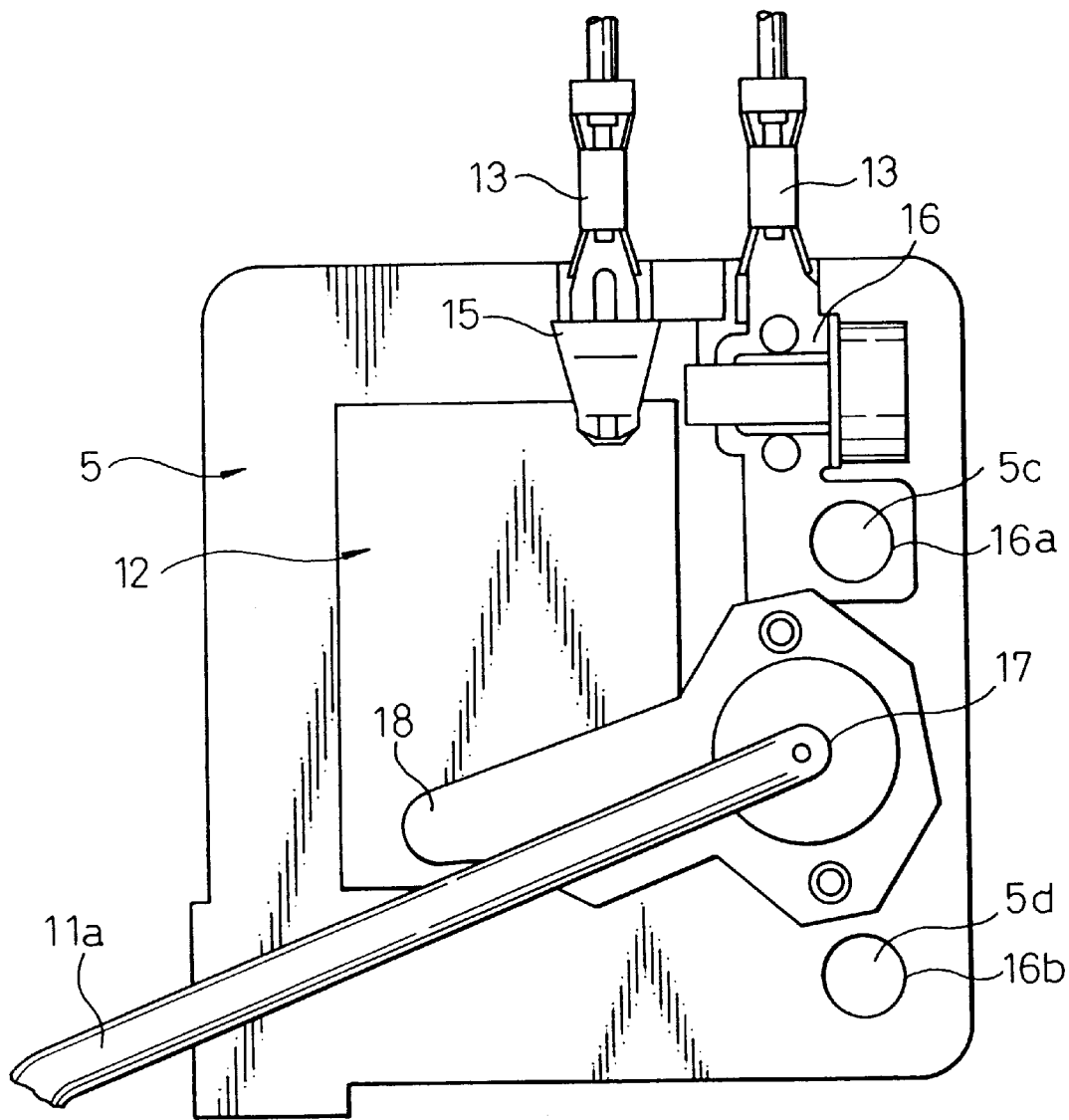
FIG. 9 is a front elevation of the fuel level detecting device in which a ground is not provided.

As shown in FIGS. 6 to 8, pawl arms 10a which extend from the either ends of the upper face of the body 5 in the direction of the mounting member 3 are provided as resilient hock members, and engagement portions 10b are provided on the mounting member 3 for connection. Thus, the body 5 is prevented from being disconnected from the slit 6 once the locking member 4 of the body 5 is inserted into the deepest part of the slit 6 of the mounting member 3.

The electrical structure of the fuel level detecting device and the mounting member 3 is as follows. A float 11 for detecting the fuel level is attached to the body 5. A variable resistor (electrical output unit) 12 of which the resistance value changes according to the position of the float 11 is provided. Furthermore, an electric terminal 13 for electrical wiring to be connected to the variable resistor 12 is provided.

As shown in FIGS. 1 and 3, a holding frame 3c is formed integrally with the mounting member 3 at the contact face 3b for fixing a connector 14 for connecting an electric terminal 13 and the holding frame 3c. Within the connector 14, a plate-shaped electric terminal is provided for electrical conduction between the inside and outside of the fuel tank 1. Further, electric connections are provided on both the inside and outside of the fuel tank 1 so that electrical conductivity between the inside and outside of the fuel tank 1 is provided once the connector 4 is mounted to the fuel tank 1.

Incidentally, a connector with an electric terminal to be connected to a motor (not indicated) for driving the fuel supply pump 2 is secured by the holding frame 3c as the connector 14.

The variable resistor 12 and the electric terminal 13 are electrically connected to each other through an electric terminal plate 15 and a ground plate 16 which are provided on the electric terminal fixed electric terminal 5b of the body 5.

The electric terminal fixing point 5b is fitted into the holding frame 3c as shown in FIG. 4 when the locking member 4 is inserted into the slit 6 in the direction A as shown in FIG. 1, and simultaneously, the electric terminal 13 is fitted into one of the electrical connecting portions, which is provided within the fuel tank 1, of the electric terminal plate of the connector 14. Thus, the fuel level detecting device is electrically conducted to the outside of the fuel tank 1.

Incidentally, one of the electric connecting points, which is provided outside of the fuel tank 1, of the electric terminal plate provided within the connector 14 is connected to a voltage source located outside of the fuel tank 1.

In the mounting arrangement, the pitch of connection electric terminals and the positioning pitch of the electric terminal plates 15 and the ground plate 16 are equal to each other to make the shape of the electric terminal 13 simple.

As mentioned above, the fuel level detecting device indicated at the bottom of FIG. 1 is a schematic illustration of the fuel level detecting device shown in FIG. 6, however the electric terminal 13 and connector 14 are omitted in FIG. 1.

Following is an explanation of how to mount the device for detecting a fuel level according this embodiment:

First, the fuel supply pump 2 is mounted to the mounting member 3, thereafter the locking member 4 is inserted into the slit 6 of the mounting face 3a provided on the mounting member 3 in the direction A.

The locking member 4 functions to position the body 5 as it is mounted to the mounting face 3a, and the electric terminal 13 is connected to the plate-shaped electric terminal contained in the connector 14 when it is further inserted. The further insertion causes the engagement portions 10b to resiliently open the pawl arms 10a provided on the either ends of the upper face of the body 5, and after the pawl arms 10a return to the original shape due to a resilient force due to the deformation, which causes engagement between the pawl arms 10a and the engagement portions 10b, thus the body 5 is mounted to the mounting member 3.

At this time, as the thickness 4a of the locking member 4 is equal to or slightly larger than the width 6a, play in the direction of the width 6a is prevented, and as the gap 4b is equal to or slightly smaller than the thickness 9, play in the direction of the thickness 9 is prevented. The pawl arms 10a and the engagement portions 10b prevent the locking member 4 from disconnected from the slit 6.

Thus, the body 5 and the mounting member 3 resiliently fit to lock each other, and the fuel level detecting device is connected to the fuel supply pump 2. Simultaneously, electric conduction between the electric terminal 13 and the electric terminal plate contained in the connector 14 is ensured.

After that, the fuel level detecting device is put into the opening 1a formed in the fuel tank 1 together with the fuel supply pump 2 so that the mounting member 3 and the fuel tank 1 intimately contact with each other and are fixed by, for example a screw, to complete the mounting work.

Thus, the mounting member 3 and the body 5 resiliently fit to lock each other, therefore a troublesome work, such as screwing for mounting, can be avoided. In addition to this, the cost can be reduced as a holder is not required.

Further, the embodiment has advantage since no wiring work for electrically connecting the fuel level detecting device and the voltage source located outside of the fuel tank 1 is necessary.

In addition to above, the embodiment does not require lead wires, which were used in prior art, for connecting the fuel level detecting device to the electric terminals of the connector 14 which electric terminals are located within the fuel tank 1, which further reduces the production cost.

The fuel level is detected in following manner.

A float 11 changes its position in accordance with the fuel level in the fuel tank. An axle 17, to which the float 11 is attached through a bar 11a, rotates according to the change of the float position. Thus, a detecting unit 18 provided on the axle 17 rotates correspondingly to change the resistance value of the variable resistor 12. The fuel level is detected based upon the changes of the resistance value. At the same time, based on the result of fuel level detection, the remaining quantity of fuel is indicated on a meter.

The Second Embodiment

The second embodiment will be described with reference to FIGS. 9 to 14. According to the second embodiment, the fuel level detecting device is directly applied to a fuel supply pump 2 of an automobile instead of a mounting member 3. In the drawings, the elements similar to those in the first embodiment are indicated by the same numbers.

Figure 14:
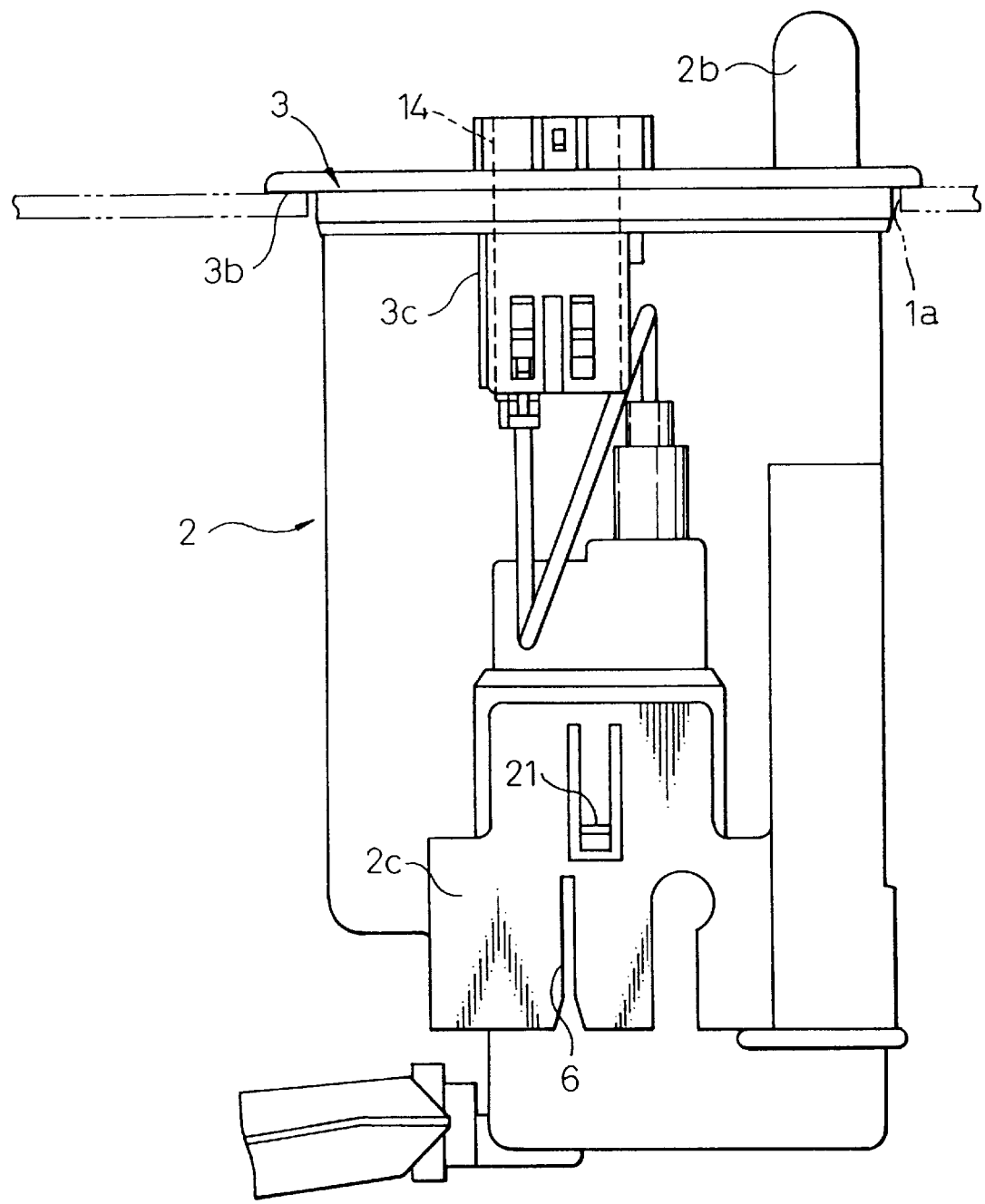
FIG. 14 is a general view of the fuel supply pump of FIG. 13, in which the fuel level detecting device is not mounted.

As shown in FIG. 14, the fuel supply pump 2 includes a mounting face 2c formed perpendicular to the contact face 3c at the lower part thereof. The mounting face 2c includes the slit 6 for receiving the locking member 4 on the body 5. A resin or metal material is employed as a material of the mounting face 2, and in this particular embodiment, the mounting face 2c is made of a steel material.

The locking member 4 also has the lugs 7 and clamping portions 8 as stated in the preceding embodiment, and the geometrical relation between the locking member 4 and the slit 6 is identical to that of the first embodiment.

The holding frame 3c is provided on the contact face 3b of the mounting face 3b for mounting the connector 14 for connecting the wire connected to the electric terminal 13. A connection electric terminal of a driving motor for the fuel supply pump 2 is also attached to the connector 14.

Within the connector 14, a plate-shaped electric terminal is provided for electrically conducting the inside and outside of the fuel tank 1. Electrically connecting portions are provided on both the inside and outside of the fuel tank 1 to provide an electric conductivity therebetween when the connector 14 is mounted to the fuel tank 1.

In addition to this, the electric terminal 13 is connected to the body 5 through an electric terminal plate 15 and a ground plate 16. The connector 14 and the electric terminal 13 are electrically connected to each other by wire 20 when the body 5 is mounted to the mounting face 2c to provide electric conductivity between the fuel level detecting device and the outside of the fuel tank 1.

Figure 10:
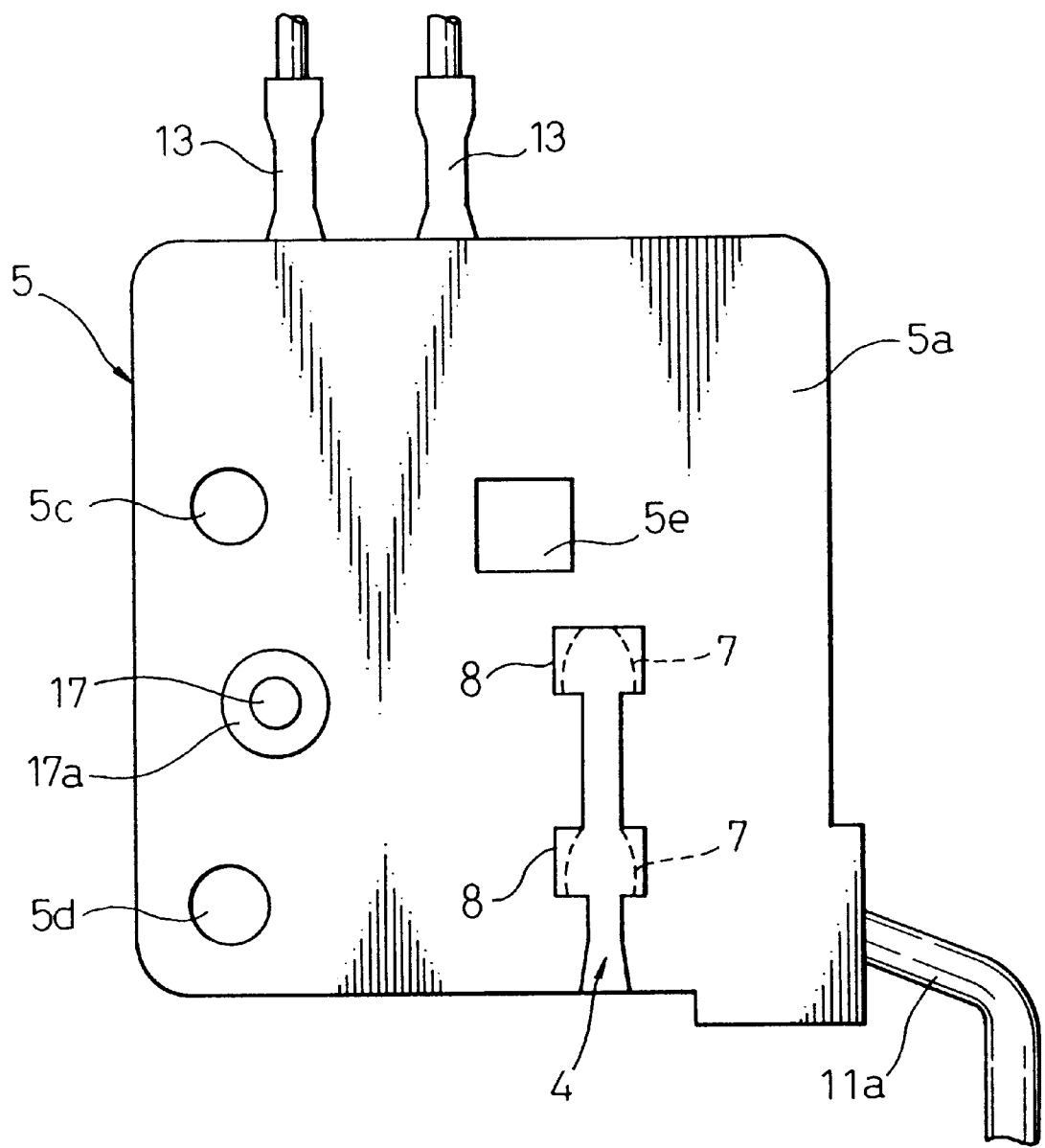
FIG. 10 is a rear elevation of the fuel level detecting device in which a ground is not provided.

As shown in FIGS. 10 and 14, in the second embodiment, as a first locking means, an opening 5e is provided in the contact face 5a, where the body 5 and the mounting face 3a make contact, in addition to the locking member 4. A pawl 21 is provided in the mounting face 2c as a second locking means in addition to the slit 6.

Subsequently, if a fuel supply pump 2 is mounted to the fuel tank 1, in the embodiment, the mounting face 2c is made of metal so that the mounting face 2c is electrically connected to the ground of an automobile, in which case the ground is provided in the following manner.

Figure 11:
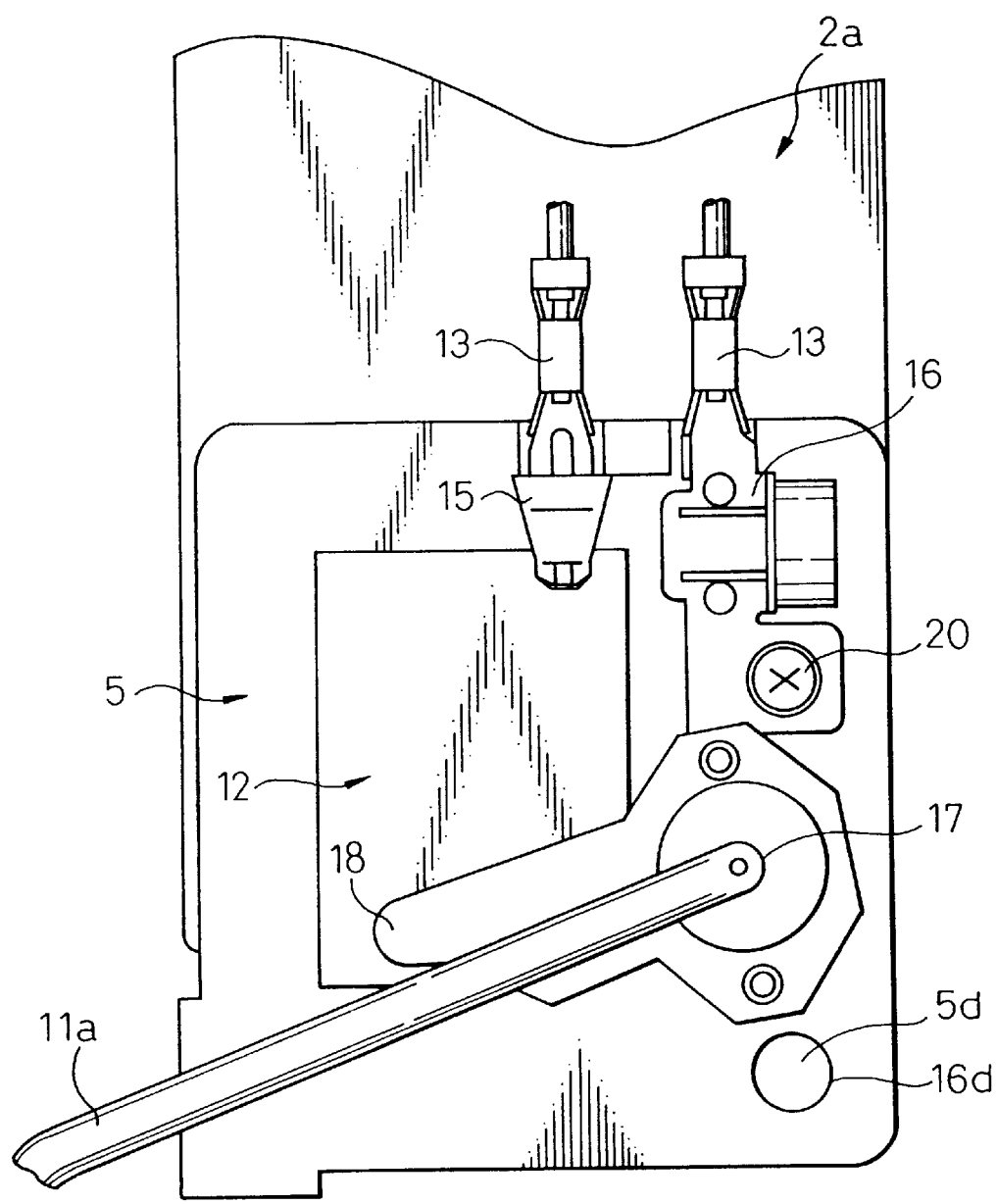
FIG. 11 illustrates the fuel level detecting device with one of electric terminals electrically connected to a metal mounting face in the first embodiment.
Figure 12:
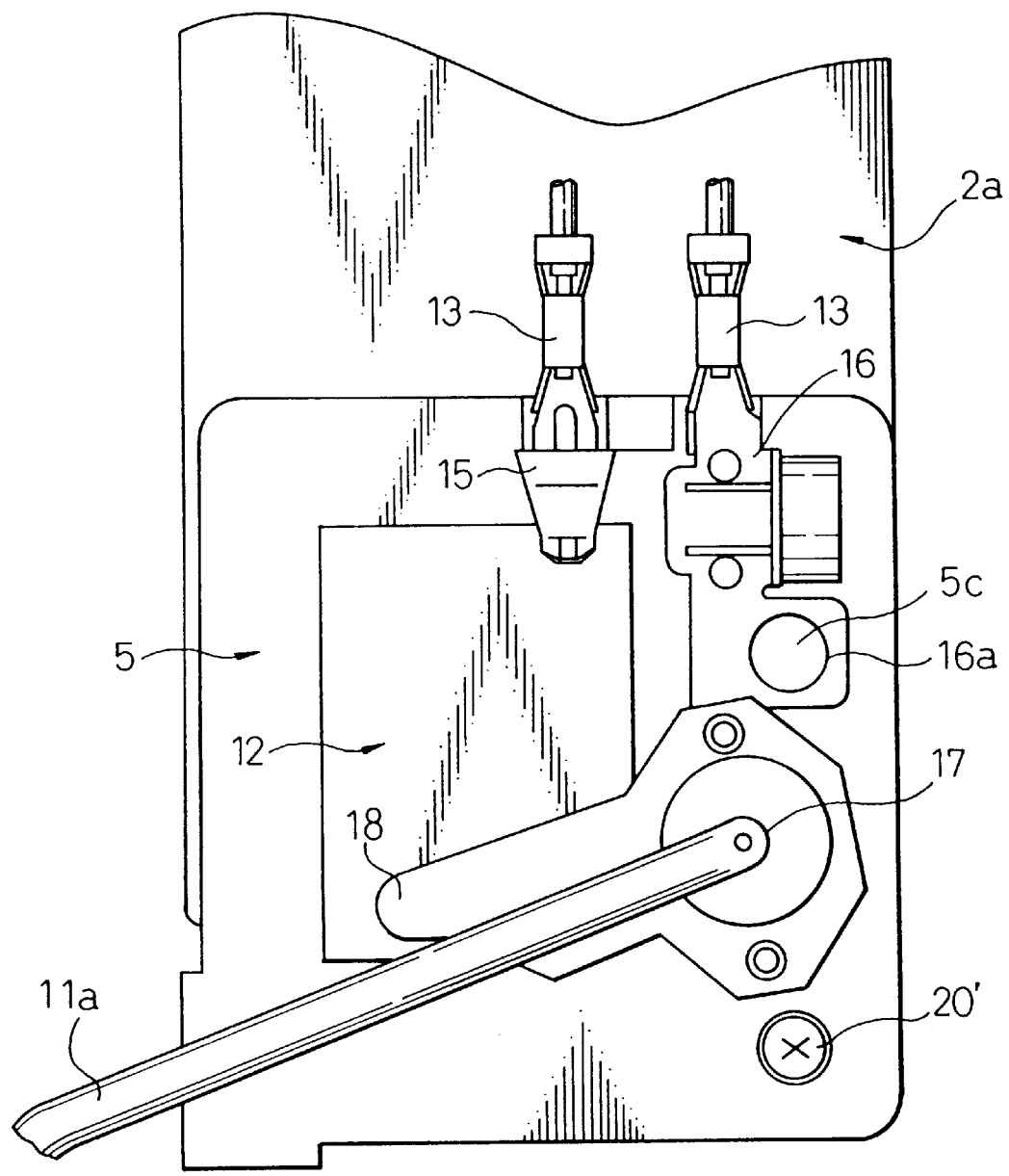
FIG. 12 illustrates the fuel level detecting device in which the electric terminal is not electrically connected to the metal mounting face in the first embodiment.
Figure 13:
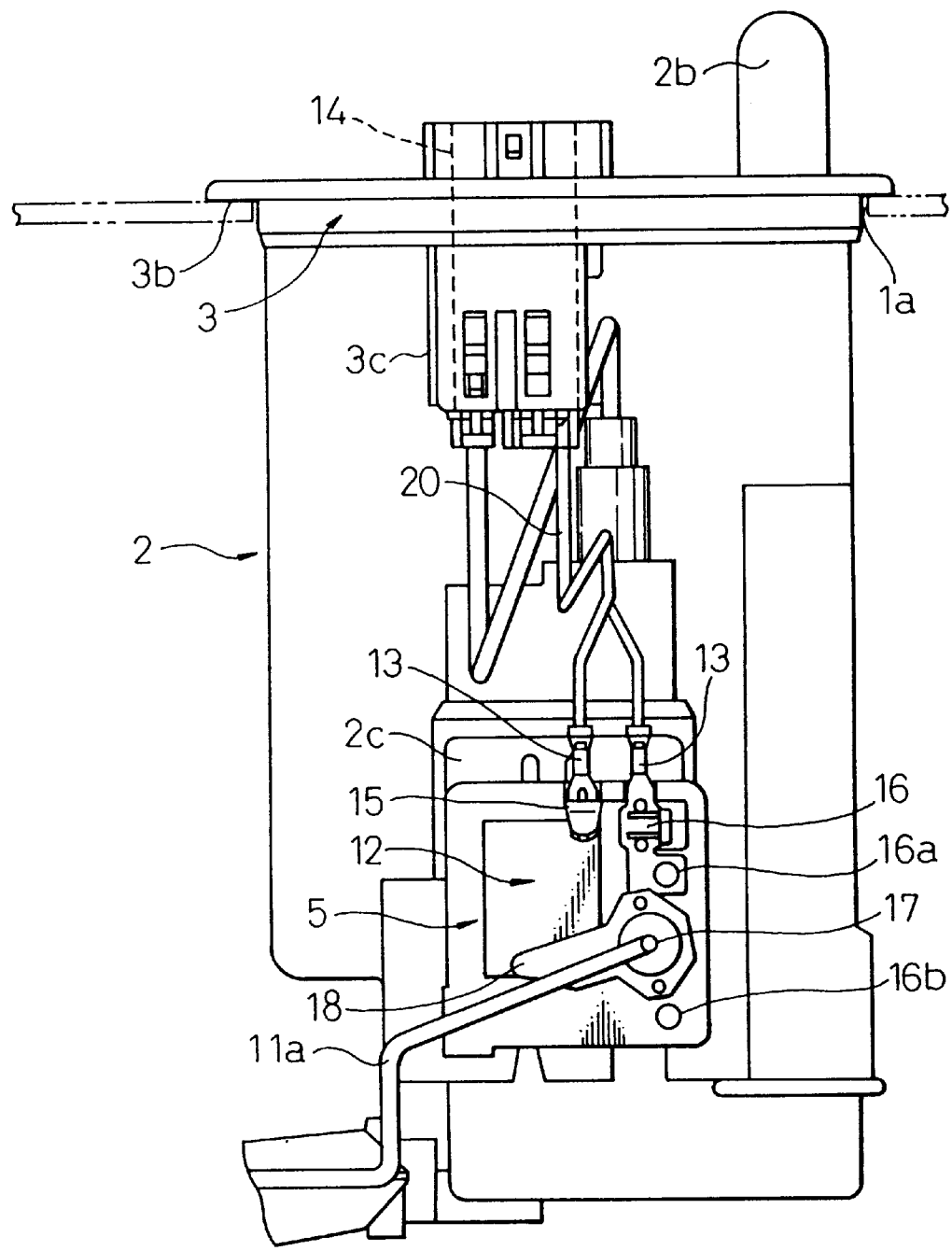
FIG. 13 is a general view of the fuel supply pump according to the second embodiment in which the fuel level detecting device is mounted to a mounting face of the fuel supply pump.

As shown in FIGS. 10 to 12, an opening 16a is provided in a ground plate 16 to be attached to the body 5 of the fuel level detecting device, and an opening for grounding 5c is provided in a position of the body 5 which overlaps over the opening 16a when the ground plate 16 is attached to the body 5. Then, a tap is provided on a position where the opening 5c overlaps over the mounting face 2a when the body 5 is mounted to the mounting face 2a.

As shown in FIG. 11, the mounting member 3 is electrically connected and grounded by screwing together the ground plate 16, the body 5 and the tap to a conductive screw 19.

The following is an explanation of how to mount the device.

First, the fuel supply pump 2 is mounted to the mounting member 3, and after that, the locking member 4 is inserted into the slit 6 provided in the mounting face 3a of the mounting member 3.

The locking member 4 functions to position the body 5 as it is mounted to the mounting face 3a, and the pawl 21 provided on the mounting face 2c is resiliently deformed by the body 5 and, after that, the pawl 21 and the opening 5e lock to each other by the resilient force due to the deformation. Thus the body 5 is mounted to the mounting member 3.

Then, as the thickness 4a of the locking member 4 is equal to or slightly larger than the width 6a, play in the direction of the width 6a is prevented, and as the gap 4b is equal to or slightly smaller than the thickness 9, play in the direction in the direction of the thickness 9 of the mounting face 2a is prevented. The pawl 21 and the opening 5e prevent the locking member 4 from being disconnected from the slit 6. Thus, the fuel level detecting device and the fuel supply pump 2 are resiliently fitted to lock each other and are integrated into one body.

When the mounting face 2c is electrically connected to the ground of an automobile, the ground plate 16, the body 5 and a tap are screwed together through a ground opening 5c.

After that, the fuel level detecting device is put into an opening 1a formed on the fuel tank 1 along with the fuel supply pump 2, and at the end, the mounting member 3 and the fuel tank 1 intimately contact with each other and one fixed by, for example, a screw to complete the mounting work.

The basic method of detection of the fuel level through the fuel level detecting device is identical to that stated above, and based on the result of the fuel detection, the remaining quantity of the fuel is indicated on a meter.

The Third Embodiment

With reference to FIGS. 15 to 23, the third embodiment will be described. According to the third embodiment, the fuel level detecting device is directly applied to a fuel supply pump 2 of an automobile as in the second embodiment, and in addition to this, the height at which the fuel level detecting device is mounted can be selected in the level direction. In the drawings, the elements similar to those in the first embodiment are indicated by the same numbers.

Figure 15:
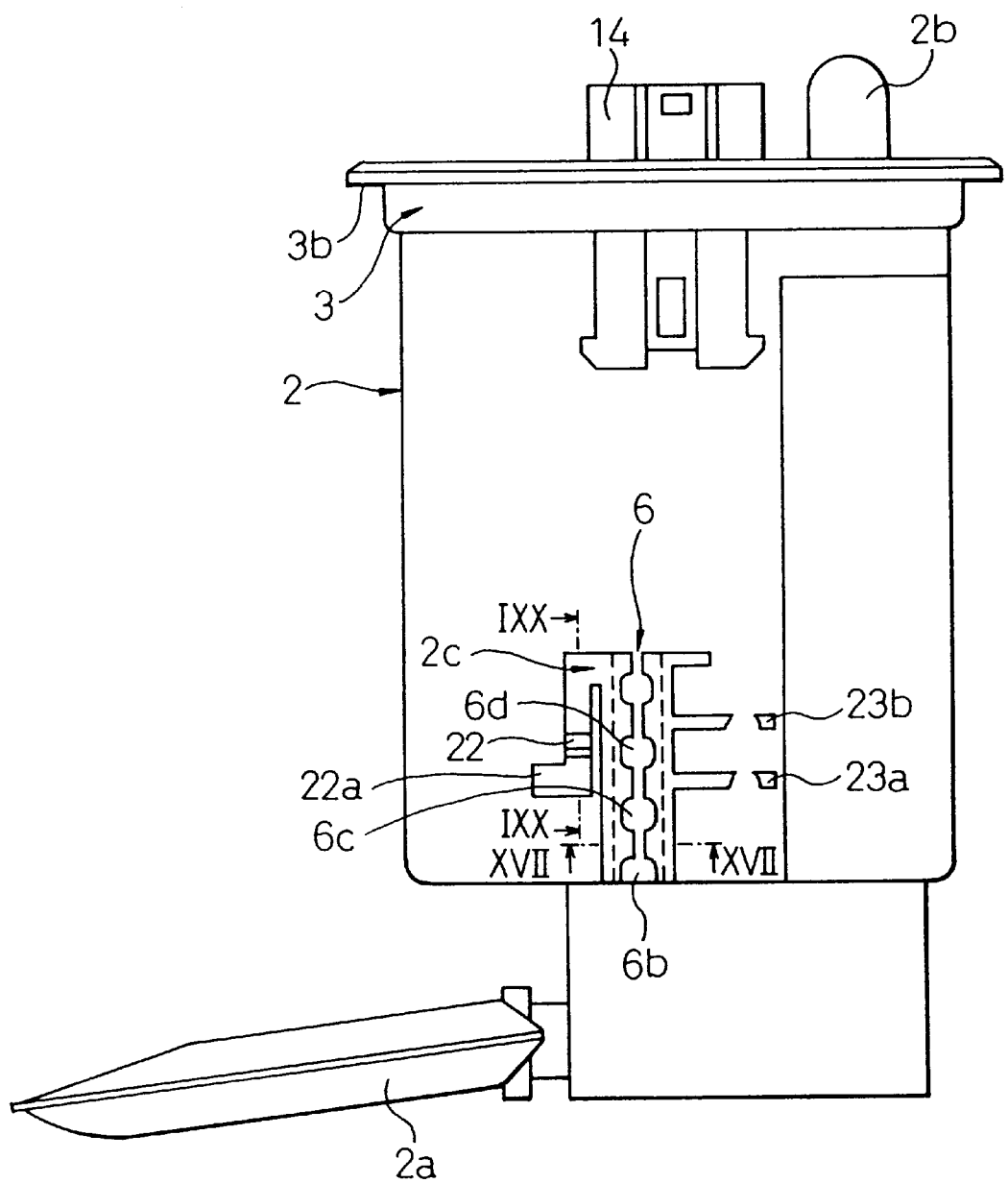
FIG. 15 is a general view of the fuel supply pump according to the third embodiment, in which the fuel level detecting device is not mounted.

As shown in FIG. 15, a mounting face 2c is formed on the lower part of the fuel supply pump 2 perpendicular to the contact face 3b. The mounting face 2c includes a slit 6 for receiving a locking member 4 on a body 5 shown in FIG. 16. The mounting face 2c is formed of a resin material integral with the fuel supply pump 2 into one body.

Figure 17:
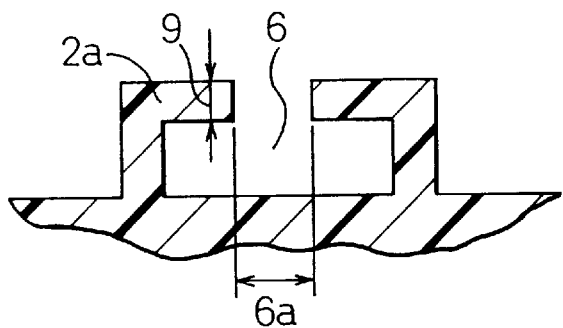
FIG. 17 is a sectional view along line XVII—XVII in FIG. 15.
Figure 18:
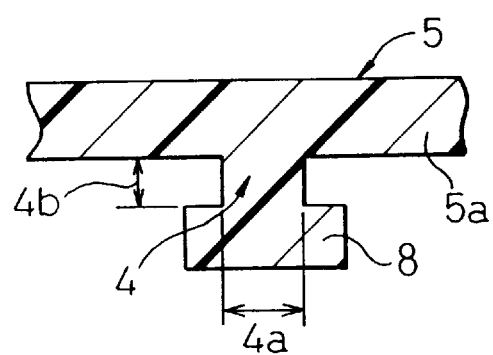
FIG. 18 is a sectional view along line XVIII—XVIII in FIG. 16.

Clamping portions 8 having a width larger than the thickness 4a of the locking member 4 are provided on the locking member 4. FIG. 17 is a sectional view along line VIIX—VIIX in FIG. 15. FIG. 18 is a sectional view along line IIXX—IIXX in FIG. 16. The thickness 4a of the locking member 4 is equal to the width 6a of the slit 6. Also, the gap 4b between the contact face 5a and the clamping portions 8 is equal to the thickness 9 of the mounting face 2c so that the mounting face 2c is clamped between the contact face 5a and the clamping portions 8.

Thus, when the locking member 4 is fitted into the slit 6, play in the direction of the width 6a of the slit 6 and that in the direction of the thickness 9 of the mounting face 2c are prevented.

Figure 19:
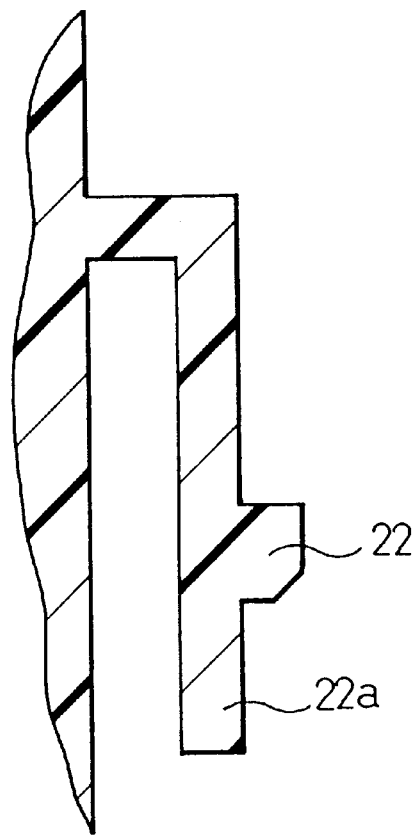
FIG. 19 is a sectional view along line IXX—IXX in FIG. 15.

In addition to above, openings 5f and 5g are provided at different height as a first locking means on the body 5 in addition to the locking member 4. FIG. 19 is a sectional view along line IXX—IXX of the mounting face 2c in FIG. 15. As shown in FIG. 19, a pawl 22 is formed at the mounting face 2c as a second locking means in addition to the slit 6.

Provided along the slit 6 on the mounting face 2c are inserting openings 6b, 6c and 6d through which the clamping portions 8 are inserted so that the fuel level detecting device is mounted to the fuel supply pump 2.

Figure 16:
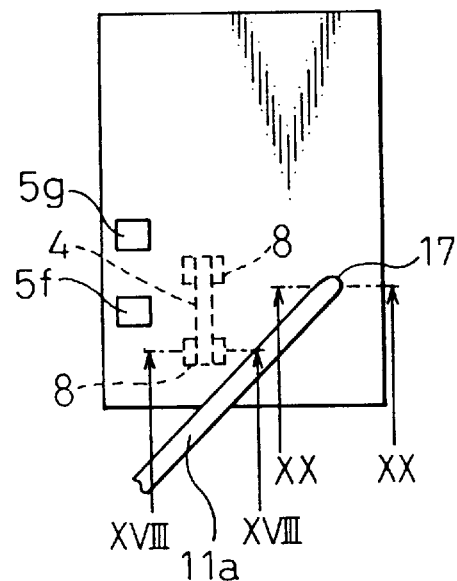
FIG. 16 is a front elevation of the fuel level detecting device according to the third embodiment.
Figure 20:
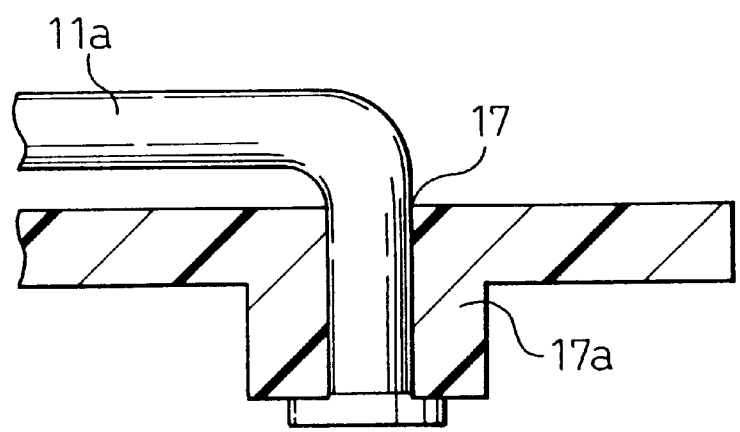
FIG. 20 is a sectional view along line XX—XX in FIG. 16.

FIG. 20 is a sectional view along line XX—XX in FIG. 16. As shown in FIG. 20, a bearing portion 17a protrudes from the contact face 5a for supporting a rotating axis 17 of a bar 11a to which a float 11 is attached. The fuel supply pump 2 includes receptacles 23a and 23b aligned in the level direction for receiving the bearing portion 17a.

Though omitted in the embodiment, the fuel level detecting device shown in FIG. 16 is provided with a variable resistor 12, an electric terminal 13 of an electric wire connected to the variable resistor 12, a float 11, as in the first embodiment, and an electric wire extended from the electric terminal 13 is connected to a connector 14. The connector 14 is constructed so that electric conduction between the inside and outside of the fuel tank 1 is provided as it is in the first embodiment.

The mounting work will be described. First, an example where the fuel level detecting device is plated at relatively lower side of the fuel supply pump 2 is described.

The clamping portions 8 are inserted into the inserting openings 6b and 6c. When the contact face 5a and the mounting face 2c come into contact, the body 5 is be shifted toward the mounting member 3. A further shift of the body 5 causes resilient deformation of the pawl 22, and after that, the pawl 22 returns to the original shape at the opening 5g, when the pawl 21 and the opening 5g fit together. The bearing portion 17a extending from the contact face 5a is locked by the receptor 23a.

Figure 21:
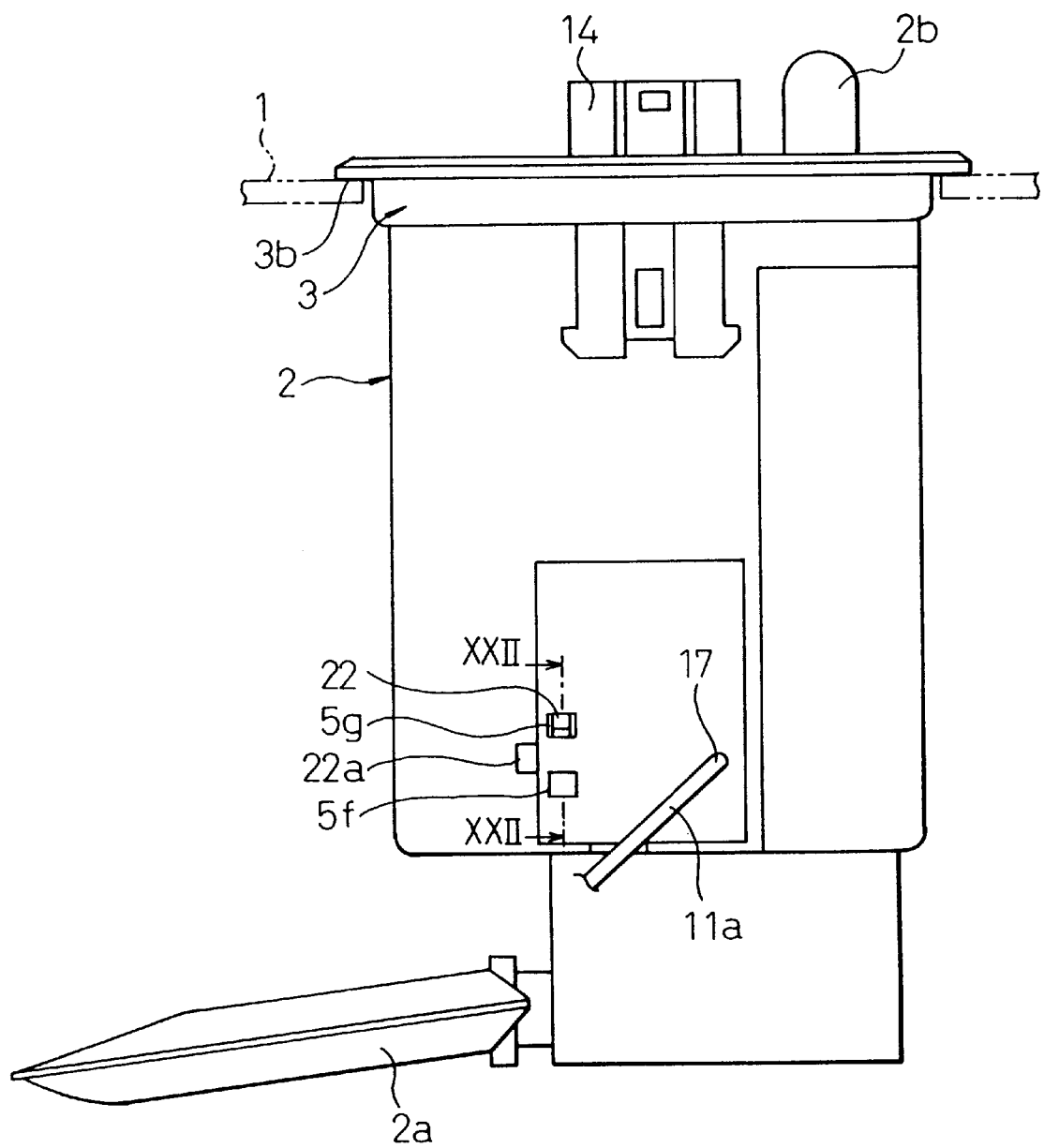
FIG. 21 is a side elevation of the fuel supply pump in which the fuel level detecting device is mounted to the fuel supply pump at a relatively low position.
Figure 22:
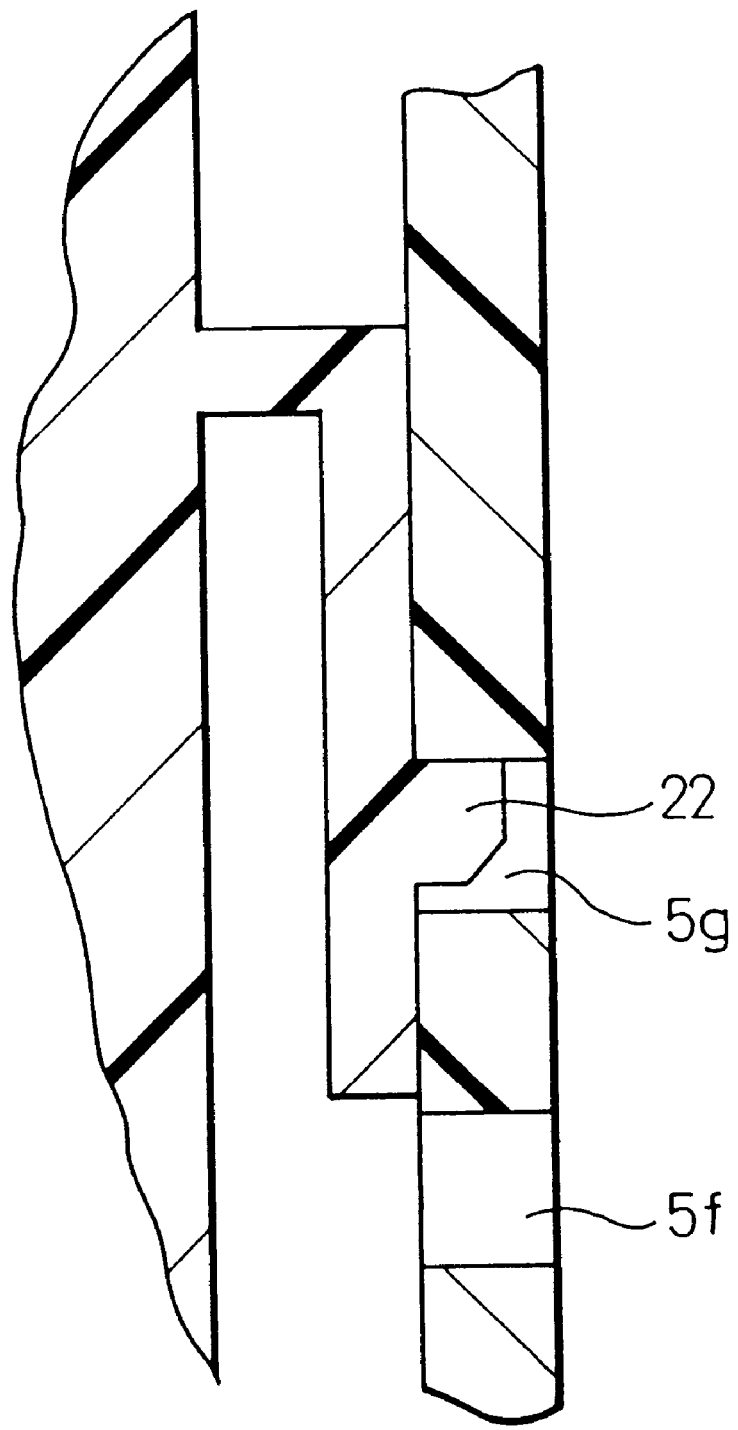
FIG. 22 is a sectional view along line XXII—XXII in FIG. 21.
Figure 23:
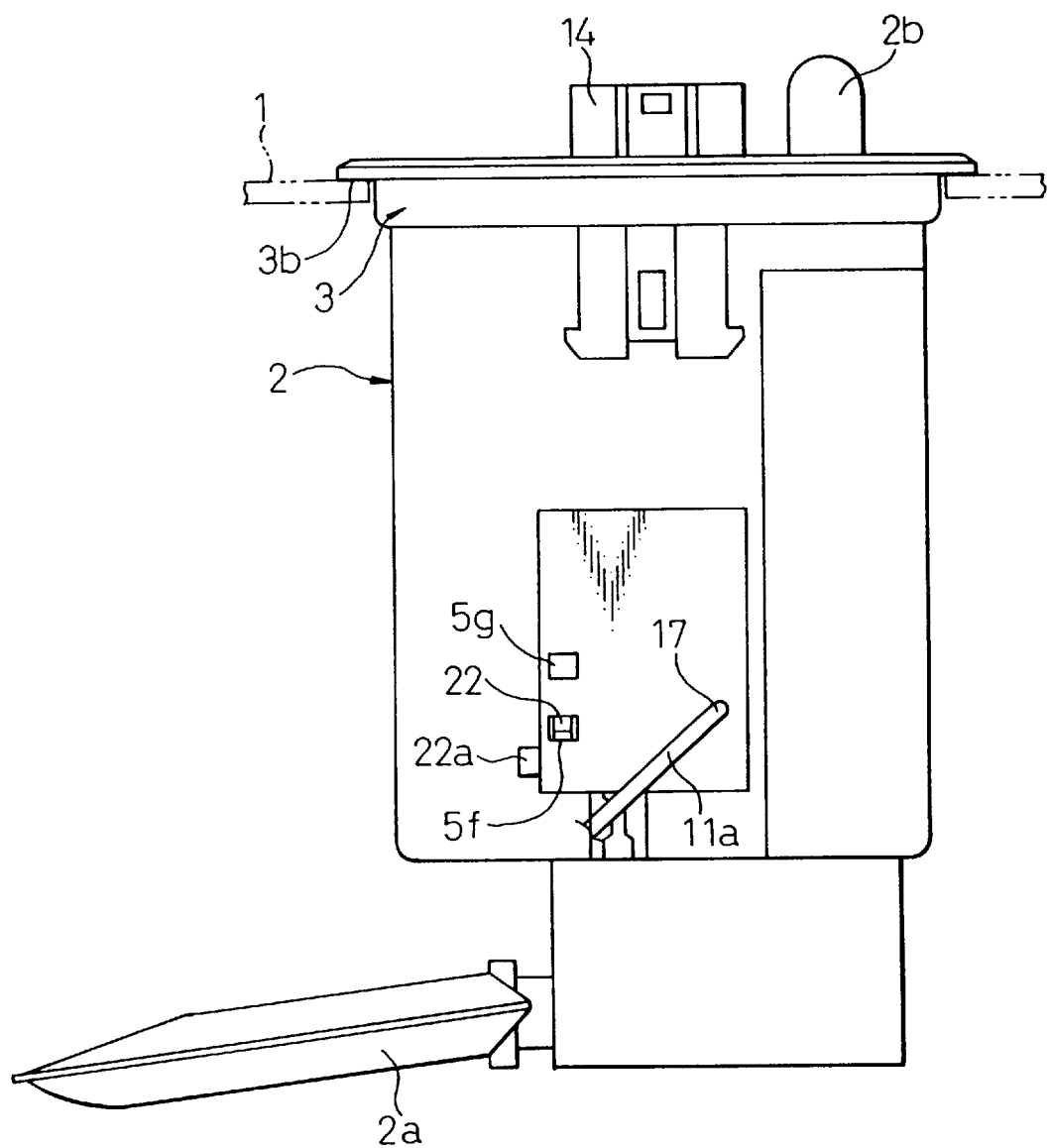
FIG. 23 is a side elevation of the fuel supply pump in which the fuel level detecting device is mounted to the fuel supply pump at a relatively higher position.
Figure 24A:
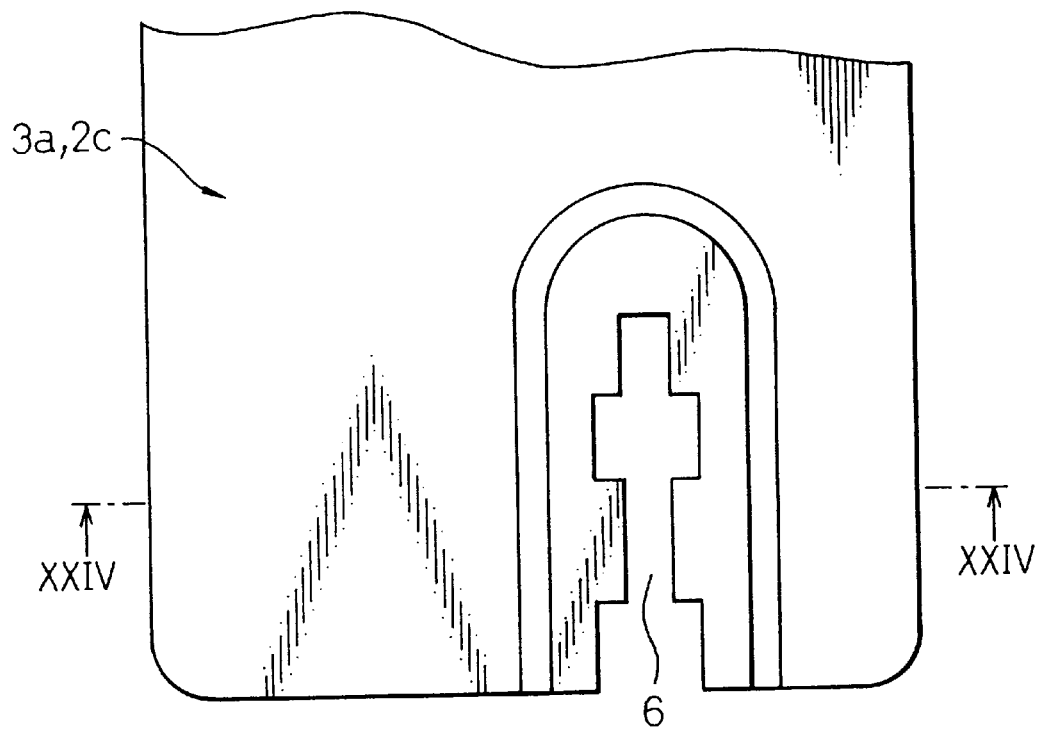
FIG. 24A is an enlarged detail of the locking member in an alternative embodiment.
Figure 24B:
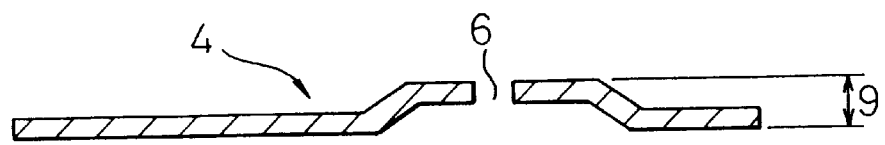
FIG. 24B is an enlarged sectional view along line XXIV—XXIV in FIG. 24A.

Thus, as shown in FIG. 21, the fuel level detecting device is mounted at a relatively low side of the fuel supply pump 2. FIG. 22 is a sectional view along line XXII—XXII in FIG. 21. Extended further from the pawl 22 is a releasing portion 22a for easy release of the body 5 off the fuel supply pump by releasing the pawl 22 off the opening 5g by pushing.

Thus, in case the fuel level detecting device is located at relatively low side of the fuel supply pump 2, the body 5 is locked by the engagement between the bearing portion 17a and the receptor 23a so that the body is prevented from being disconnected from the supply pump 2.

The following is a description of an example where the fuel level detecting device is located at relatively high side of the fuel supply pump 2. The clamping portions 8 are inserted into the inserting openings 6c and 6d. Then, the body 5 is shifted in the direction of the mounting member 3 in the same way as stated above. The pawl 22 fits into the opening 5f. Also the bearing portion 17a is locked by the receptor 23b. Thus, the fuel level detecting device is mounted at a comparatively high side of the fuel supply pump 2.

Thus, when the fuel level detecting device is located at relatively high side of the fuel supply pump 2, the body 5 is locked by the engagement between the bearing portion 17a and the receptor 23b, and the pawl 22 and the opening 5f prevent the body 5 from being disconnected from the fuel supply pump 2.

According to the mounting arrangement described above, the fuel level detecting device can be mounted at more than one position in the level direction, which allows, for example, the float 11 to change its height in accordance with the shape of the fuel supply pump 2.

The fuel level detecting device is, after that, put into the opening 1a along with the fuel supply pump 2, and at the end, the mounting member 3 and the tank 1 intimately contact with each other and are fixed by, for example, a screw, which reduces the labor of the mounting work.

The basic method of detecting the fuel level by the fuel level detecting device is identical to that stated above, and based on the result of the fuel detection, the remaining quantity of the fuel is indicated on a meter.

Although, in the embodiment, the fuel level detecting device is directly mounted to the mounting face 2c of the fuel supply pump 2, it is possible to mount the level detecting device to the mounting face 3a of the mounting member 3 so that the height of the float 11 can be selected. The locking member may include a lug as in the preceding embodiment.

Alternative Embodiments

Figure 25A:
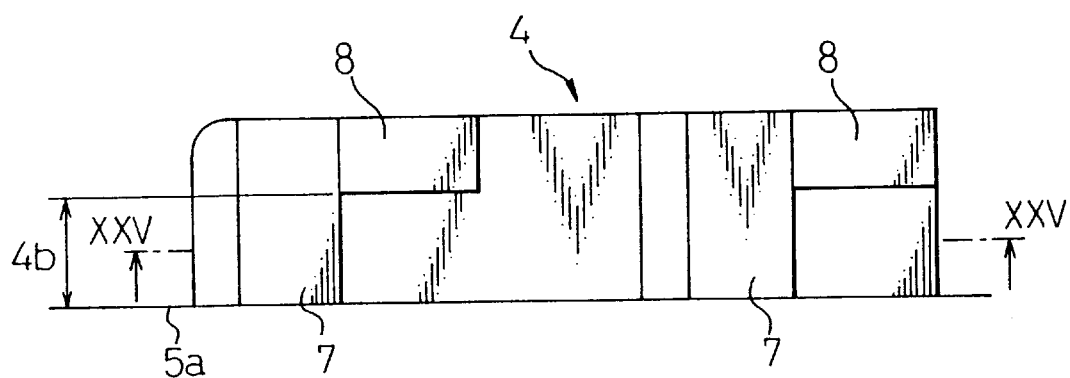
FIG. 25A is a front elevation of the mounting face according to another embodiment which is modified so that the mounting face is made of metal to reduce weight.
Figure 25B:
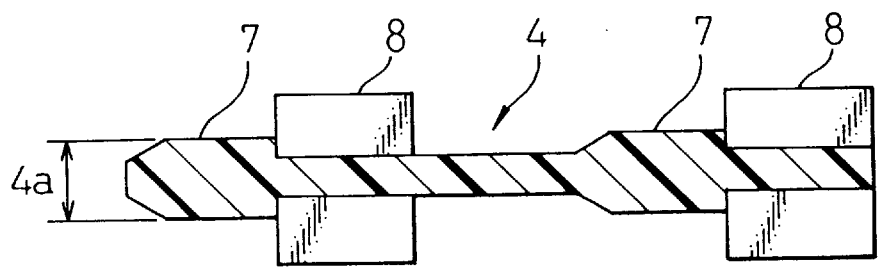
FIG. 25B is a sectional view along line XXV—XXV in FIG. 25A.

In the first and the second embodiment, the shape of the locking member 4 is as shown in FIG. 2. Namely, the lugs 7 and the clamping portions 8 are provided to align with each other and to have the same size in the direction of insertion into the slit 6, but the positions of the respective clamping portions 8 can be shifted relative to the lugs 7 in the direction of the insertion into the slit 6 as shown in FIG. 25.

In the first embodiment, pawl arms 10a are provided on the body 5, and engagement portions 10b are provided on the mounting member 3 as connecting members. The engagement portions 10b, however, can be substituted for openings so as to function same as the engagement portions.

As a method of providing a ground, when the fuel level detecting device is not connected electrically to the metal-made mounting face 2c, a non-grounded opening 5d is provided on a portion of the body 5 which is symmetrical to the ground opening 5c with respect to the axle 17 of the float 11, and a tap identical to that stated above is provided on the mounting face 2c. The body 5 and the tap are screwed together through the non-ground opening 5d by a screw 20' as shown in FIG. 12.

In this particular embodiment, the electric terminal 13 is separated from the electric terminal plate 15 and the ground plate 16, and is connected by, for example welding. Thus, a type in which a wire is used can be easily made by connecting a wire to the electric terminal 13, or by directly connecting a wire in place of the electric terminal 13.

The mounting faces 3a, 2c including the slit 6 as shown in FIG. 3 has a certain thickness 9 to ensure its strength. However, if a metallic material is used for the mounting member 3, mounting face 3a or 2c, the thickness of the mounting face 3a or 2c may be reduced to some extent from the viewpoint of strength. Therefore, the thickness of the mounting face 3a or 2c can be made thinner than the thickness 9 to reduce the weight.

At that time, the thickness of the mounting member 3 around the slit 6 can be the same as the thickness 9 by embossing the marginal zone along the slit 6 of the mounting member 3, and the same material as the body 5 can be used.

When mounted to the mounting member 3, as shown in FIG. 10, play of the body 5 can be prevented when the body 5 is inserted to the bottom of the slit 6 in the mounting face 3a or 2c by a locking means described below as in the case mounted to the fuel supply pump 2 shown in FIG. 14.

Namely, an opening 5e is provided in a contact face 5a as a first locking means, and a pawl 21 is provided on the mounting face 3a, 2c as a second locking means, which, as a combination, can substitute for the pawls 10a and the engagement portions 10b. In this case, pawl arms 10a and engagement portions 10b can be provided together with the opening 5e and the pawl 21.

Also, a substitution of the opening 5e in the body 5 for a pawl, and of the pawl 21 on the mounting face 3a, 2c for an opening can function as a means for preventing play.

It will also be understood by those skilled in the art that the forgoing description is a preferred embodiment of the disclosed device and that various changes and modifications may be made without departing from the spirit and scope of the invention.

We claim:

1. A mounting arrangement for a device, adapted to a fuel tank that has a built-in fuel supply pump mounted to the fuel tank by means of a mounting member, for detecting the fuel level in the fuel tank, comprising:

a body of the fuel detecting device, the body including a first locking structure and an electric output unit which generates electric output in accordance with the fuel level in the fuel tank;

the mounting member having a mounting face which includes a second locking structure;

the body being mounted to the mounting member by resiliently engaging the first locking structure and the second locking structure;

wherein the first locking structure includes locking elements disposed at different heights in a vertical direction; and the second locking structure selectively engages one of the locking elements of the first locking structure.

2. A mounting arrangement for a device, adapted to a fuel tank that has a built-in fuel supple pump mounted to the fuel tank by means of a mounting member, for detecting the fuel level in the fuel tank, comprising:

a body of the fuel detecting device, the body including a first locking structure and an electric output unit which generates electric output in accordance with the fuel level in the fuel tank;

the mounting member having a mounting face which includes a second locking structure;

the body being mounted to the mounting member by resiliently engaging the first locking structure and the second locking structure;

wherein the second locking structure includes locking elements disposed at different heights in a vertical direction; and the first locking structure selectively engages one of the locking elements of the second locking structure.

3. A mounting arrangement for a device, adapted to a fuel tank that has a built-in fuel supply pump mounted to the fuel tank by means of a mounting member, for detecting the fuel level in the fuel tank, comprising:

a body of the fuel detecting device, the body including a first locking structure and an electric output unit which generates electric output in accordance with the fuel level in the fuel tank;

the mounting member having a mounting face which includes a second locking structure;

the body being mounted to the mounting member by resiliently engaging the first locking structure and the second locking structure; and wherein the first locking structure and the second locking structure engage to prevent the body from shifting in a direction (A) along which the body is mounted to the mounting face, and to prevent the body from shifting to either one of two directions perpendicular to the direction (A).

4. A mounting arrangement for a device, adapted to a fuel tank that has a built-in fuel supply pump mounted to the fuel tank by means of a mounting member, for detecting the fuel level in the fuel tank, comprising:

a body of the fuel detecting device, the body including a first locking structure and an electric output unit which generates electric output in accordance with the fuel level in the fuel tank;

the mounting member having a mounting face which includes a second locking structure;

the body being mounted to the mounting member by resiliently engaging the first locking structure and the second locking structure;

wherein the first locking structure comprises a locking member extending from the body; clamping portions provided on the locking member, perpendicular to the direction of a thickness of the mounting face, which clamp the mounting face; and a plurality of pawl arms extending from either end of the top face of the body toward the mounting member;

the second locking structure including a slit that receives the locking member; and engagement portions to which the pawls resiliently engage;

a thickness of the locking member in the direction of the slit being equal to or slightly larger than a width of the slit; and the clamping portions and a contact face of the body which contacts the mounting face defining a gap therebetween, a width of the gap being equal to or slightly smaller than the thickness of the mounting face.

5. A mounting arrangement according to claim 4 wherein the first locking structure includes openings in the contact face and the second locking structure includes pawls which resiliently engage the openings.

6. A mounting arrangement for a device, adapted to a fuel tank that has a built-in fuel supply pump mounted to the fuel tank by means of a mounting member, for detecting the fuel level in the fuel tank, comprising:

a body of the fuel detecting device, the body including a first locking structure and an electric output unit which generates electric output in accordance with the fuel level in the fuel tank;

the mounting member having a mounting face which includes a second locking structure;

the body being mounted to the mounting member by resiliently engaging the first locking structure and the second locking structure;

wherein the first locking structure comprises a locking member extending from the body; clamping portions provided on the locking member, perpendicular to the direction of a thickness of the mounting face, which clamp the mounting face; and openings provided in a contact face of the body which contacts the mounting face;

the second locking structure including a slit that receives the locking member; and pawls which resiliently engage the openings;

a thickness of the locking member in the direction of the slit being equal to or slightly larger than a width of the slit; and the clamping portions and the contact face of the body which contacts the mounting face defining a gap therebetween, a width of the gap being equal to or slightly smaller than the thickness of the mounting face.

7. A mounting arrangement according to claim 6 wherein the locking member comprises a plurality of lugs having the thickness of the locking member.

8. A mounting arrangement for a device, adapted to a fuel tank that has a built-in fuel supply pump mounted to the fuel tank by means of a mounting member, for detecting the fuel level in the fuel tank, comprising:

a body of the fuel detecting device, the body including a first locking structure and an electric output unit which generates electric output in accordance with the fuel level in the fuel tank;

the mounting member having a mounting face which includes a second locking structure;

the body being mounted to the mounting member by resiliently engaging the first locking structure and the second locking structure;

an electric terminal being provided on the body, the electric terminal being adapted to be connected to the electric output unit;

a holding frame being provided on a contact face of the mounting member which face contacts the fuel tank;

connectors being secured to the holding frame electrically connecting between the inside and outside of the fuel tank;

wherein the electric terminal is inserted and electrically connected to an electric contact of one of the connectors located within the fuel tank when the body is mounted to the mounting face through the first locking structure and the second locking structure.

9. A mounting arrangement for a device, adapted to a fuel tank that has a built-in fuel supply pump mounted to the fuel tank by means of a mounting member, for detecting the fuel level in the fuel tank, comprising:

a body which includes a first locking structure and an electric output unit which generates electric output in accordance with the fuel level in the fuel tank;

the fuel supply pump having a mounting face which includes a second locking structure;

the body being mounted to the fuel supply pump by resiliently engaging the first locking structure and the second locking structure;

wherein the first locking structure includes locking elements disposed at different heights; and the second locking structure selectively engages one of the locking elements of the first locking structure.

10. A mounting arrangement for a device, adapted to a fuel tank that has a built-in fuel supply pump mounted to the fuel tank by means of a mounting member, for detecting the fuel level in the fuel tank, comprising:

a body which includes a first locking structure and an electric output unit which generates electric output in accordance with the fuel level in the fuel tank;

the fuel supply pump having a mounting face which includes a second locking structure;

the body being mounted to the fuel supply pump by resiliently engaging the first locking structure and the second locking structure;

wherein the second locking structure includes locking elements disposed at different heights; and the first locking structure selectively engages one of the locking elements of the second locking structure.

11. A mounting arrangement for a device, adapted to a fuel tank that has a built-in fuel supply pump mounted to the fuel tank by means of a mounting member, for detecting the fuel level in the fuel tank, comprising:

a body which includes a first locking structure and an electric output unit which generates electric output in accordance with the fuel level in the fuel tank;

the fuel supply pump having a mounting face which includes a second locking structure;

the body being mounted to the fuel supply pump by resiliently engaging the first locking structure and the second locking structure; and wherein the first locking structure and the second locking structure engages to prevent comprises a locking means (5e, 5f, 5g, 10a, 10b) for preventing the body from shifting in a direction (A) along which the body is mounted to the mounting face, and to prevent the body from shifting to either one of two directions perpendicular to the direction (A).

12. A mounting arrangement for a device, adapted to a fuel tank that has a built-in fuel supply pump mounted to the fuel tank by means of a mounting member, for detecting the fuel level in the fuel tank, comprising:

a body which includes a first locking structure and an electric output unit which generates electric output in accordance with the fuel level in the fuel tank;

the fuel supply pump having a mounting face which includes a second locking structure;

the body being mounted to the fuel supply pump by resiliently engaging the first locking structure and the second locking structure;

wherein the first locking structure comprises a locking member extending from the body; clamping portions provided on the locking member, perpendicular to the direction of a thickness of the mounting face, which clamp the mounting face; and a plurality of pawl arms extending from either end of the top face of the body toward the mounting member;

the second locking structure including a slit that receives the locking member; and engagement portions to which the pawls resiliently engage;

a thickness of the locking member in the direction of the slit being equal to or slightly larger than a width of the slit; and the clamping portions and a contact face of the body which contacts the mounting face defining a gap therebetween, a width of the gap being equal to or slightly smaller than the thickness of the mounting face.

13. A mounting arrangement according to claim 12 wherein the first locking structure includes openings in the contact face and the second locking structure includes pawls which resiliently engage the openings.

14. A mounting arrangement for a device, adapted to a fuel tank that has a built-in fuel supply pump mounted to the fuel tank by means of a mounting member, for detecting the fuel level in the fuel tank, comprising:

a body which includes a first locking structure and an electric output unit which generates electric output in accordance with the fuel level in the fuel tank;

the fuel supply pump having a mounting face which includes a second locking structure;

the body being mounted to the fuel supply pump by resiliently engaging the first locking structure and the second locking structure;

wherein the first locking structure comprises a locking member extending from the body; clamping portions provided on the locking member, perpendicular to the direction of a thickness of the mounting face, which clamps the mounting face; and openings provided in a contact face of the body which contacts the mounting face;

the second locking structure including a slit that receives the locking member; and pawls which resiliently engage the openings;

a thickness of the locking member in the direction of the slit being equal to or slightly larger than a width of the slit; and the clamping portions and the contact face of the body which contacts the mounting face defining a gap therebetween, a width of the gap being equal to or slightly smaller than the thickness of the mounting face.

15. A mounting arrangement according to claim 14 in which the locking member comprises a plurality of lugs having the thickness of the locking member.

16. A mounting arrangement for a device, adapted to a fuel tank that has a built-in fuel supply pump mounted to the fuel tank by means of a mounting member, for detecting the fuel level in the fuel tank, comprising:

a body which includes a first locking structure and an electric output unit which generates electric output in accordance with the fuel level in the fuel tank;

the fuel supply pump having a mounting face which includes a second locking structure;

the body being mounted to the fuel supply pump by resiliently engaging the first locking structure and the second locking structure;

an electric terminal being provided on the body, the electric terminal being adapted to be connected to the electric output unit;

a holding frame being provided on a contact face of the mounting member which face contacts the fuel tank;

connectors being secured to the holding frame electrically connecting between the inside and outside of the fuel tank;

wherein the electric terminal is inserted and electrically connected to an electric contact of one of the connectors located within the fuel tank when the body is mounted to the mounting face through the first locking structure and the second locking structure.

* * * * *